(12) United States Patent
Chen

(10) Patent No.: US 12,507,092 B2
(45) Date of Patent: Dec. 23, 2025

(54) MEASUREMENT REPORTING METHOD AND APPARATUS

(71) Applicant: Huawei Technologies Co., Ltd., Shenzhen (CN)

(72) Inventor: Lei Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/514,373

(22) Filed: Oct. 29, 2021

(65) Prior Publication Data

US 2022/0053351 A1 Feb. 17, 2022

Related U.S. Application Data

(63) Continuation of application No. PCT/CN2020/079295, filed on Mar. 13, 2020.

(30) Foreign Application Priority Data

Apr. 30, 2019 (CN) .......................... 201910364172.X

(51) Int. Cl.
*H04W 16/28* (2009.01)
*H04B 17/318* (2015.01)
(Continued)

(52) U.S. Cl.
CPC .......... *H04W 24/08* (2013.01); *H04B 17/318* (2015.01); *H04L 5/0048* (2013.01); *H04W 24/10* (2013.01)

(58) Field of Classification Search
CPC .... H04W 24/10; H04W 24/08; H04L 5/0048; H04B 17/318
See application file for complete search history.

(56) References Cited

U.S. PATENT DOCUMENTS 10,136,434 B2 11/2018 Gerszberg et al.
2013/0094560 A1* 4/2013 Ezaki .................. H04L 25/0224
375/226
(Continued)

FOREIGN PATENT DOCUMENTS

CN 106912101 A 6/2017
CN 107889141 A 4/2018
(Continued)

OTHER PUBLICATIONS

"RAT-Dependent DL-Only NR Positioning Techniques," Agenda Item: 7.2.10.1.1, Source: Qualcomm Incorporated, Document for: Discussion and Decision, 3GPP TSG RAN WG1 #96, R1-1903018, Athens, Greece, Feb. 25th-Mar. 1, 2019, 11 pages.

*Primary Examiner* — Dai Phuong
(74) *Attorney, Agent, or Firm* — SLATER MATSIL, LLP

(57) ABSTRACT

A measurement reporting method and an apparatus, the method including receiving, from network devices, reference signals based on beams, obtaining measurement results by measuring the received reference signals, where the measurement results comprise reference signal received powers, receiving information about transmit beams from the network devices, and determining downlink angles of departure relative to the network devices based on the measurement results and the information about the transmit beams, where the information about the transmit beams includes at least one of characteristic information of the transmit beams or beam radiation mode information of the transmit beams.

20 Claims, 8 Drawing Sheets

(51) Int. Cl.
    *H04L 5/00*     (2006.01)
    *H04W 24/08*     (2009.01)
    *H04W 24/10*     (2009.01)

(56) References Cited

U.S. PATENT DOCUMENTS

| | | |
|---|---|---|
| 2016/0274215 A1 | 9/2016 | Edge et al. |
| 2016/0285525 A1* | 9/2016 | Budianu ............... H04L 5/0057 |
| 2017/0302352 A1 | 10/2017 | Islam et al. |
| 2018/0062711 A1* | 3/2018 | Mizusawa ............ H04B 7/0452 |
| 2018/0343046 A1 | 11/2018 | Park et al. |
| 2019/0037529 A1 | 1/2019 | Edge et al. |
| 2019/0230547 A1 | 7/2019 | Li et al. |
| 2019/0268117 A1* | 8/2019 | Nilsson ................. H04W 16/28 |
| 2020/0120530 A1 | 4/2020 | Luo et al. |
| 2020/0153498 A1* | 5/2020 | Kotecha ............... H04B 7/0421 |
| 2020/0200851 A1* | 6/2020 | Homsky ................... G01S 1/14 |
| 2020/0213162 A1* | 7/2020 | Lo ....................... H04L 25/0242 |
| 2020/0227825 A1* | 7/2020 | Hosseini ............ H04B 7/06952 |
| 2020/0267684 A1* | 8/2020 | Huang ................. H04L 5/0051 |
| 2020/0280820 A1* | 9/2020 | Zhang ................... G01S 5/0244 |
| 2021/0014821 A1* | 1/2021 | Ku .......................... H04W 4/40 |

FOREIGN PATENT DOCUMENTS

| | | |
|---|---|---|
| CN | 108111210 A | 6/2018 |
| CN | 108989011 A | 12/2018 |
| CN | 109347529 A | 2/2019 |

\* cited by examiner

MEASUREMENT REPORTING METHOD AND APPARATUS

CROSS-REFERENCE TO RELATED APPLICATIONS

This application is a continuation of International Application No. PCT/CN2020/079295, filed on Mar. 13, 2020, which claims priority to Chinese Patent Application No. 201910364172.X, filed on Apr. 30, 2019. The disclosures of the aforementioned applications are hereby incorporated by reference in their entireties.

TECHNICAL FIELD

This application relates to the communication field, and specifically, to a measurement reporting method and an apparatus.

BACKGROUND

Angle-based positioning is a common positioning technology. Base stations estimate position-angle relationships between the base stations and a terminal device by measuring received signals (uplink signals) or based on measurement feedback of the terminal device on sent signals (downlink signals), to further position the terminal device based on a plurality of groups of such position-angle relationships.

For example, in a positioning scenario based on a downlink angle of departure (DL-AOD), the base stations send downlink reference signals to the terminal device in different beam directions. The terminal device receives and measures reference signal received powers (RSRPs) of a plurality of reference signals, and reports the RSRPs of the reference signals to the base stations. The base stations obtain DL-AODs between the terminal device and the base stations by using a proportion relationship between the RSRPs of the reference signals sent in different beam directions and beam directions corresponding to the reference signals.

Currently, in a positioning technology in which a downlink angle is used for positioning, measurement results that are of the reference signals and that are reported by the terminal device include only the RSRPs. This affects estimation precision of the downlink angle, and affects positioning precision.

SUMMARY

This application provides a measurement reporting method and an apparatus, and an increase in a reporting quantity helps improve estimation precision of a downlink angle, so that positioning precision of positioning by using the downlink angle can be improved.

According to a first aspect, a measurement reporting method is provided. The method includes receiving, from network devices, reference signals sent based on beams, measuring the received reference signals to obtain measurement results, and sending the measurement results to the network devices, where the measurement results include reference signal received powers and at least one of the following two items of information: channel phases of the reference signals and channel matrices of the reference signals.

According to a second aspect, a measurement reporting method is provided. The method includes sending reference signals to a terminal device based on beams, receiving measurement results of the reference signals from the terminal device, and obtaining downlink angles of departure relative to the terminal device based on the measurement results, where the measurement results include reference signal received powers and at least one of the following two items of information: channel phases of the reference signals and channel matrices of the reference signals.

It should be understood that channel phases of channels for transmitting the reference signals may represent information about time points at which a receive end (namely, the terminal device) receives the reference signals. Therefore, the channel phases help the network devices estimate angles of departure (AODs), and to some extent, accuracy of AOD estimation can be improved.

It should be further understood that channel matrices of the channels for transmitting the reference signals also help the network devices estimate relatively accurate AODs.

Compared with a conventional technology, in this application, in addition to the received powers, the terminal device further reports at least one of the channel phases and the channel matrices, so that accuracy of AOD estimation can be improved.

With reference to the first aspect or the second aspect, in a possible implementation of the first aspect or the second aspect, the channel phases of the reference signals include phases on time domain paths on the reference signals, or phases determined based on phases of all reference signals within a measurement bandwidth.

With reference to the first aspect or the second aspect, in a possible implementation of the first aspect or the second aspect, the channel matrices of the reference signals include an inter-beam channel matrix, and/or an intra-beam channel matrix.

With reference to the first aspect or the second aspect, in a possible implementation of the first aspect or the second aspect, the intra-beam channel matrix includes a channel matrix determined on different time domain paths of a same reference signal, or a channel matrix determined on different frequency domain subbands of a same reference signal.

With reference to the first aspect, in a possible implementation of the first aspect, the sending the measurement results to the network devices includes performing reporting processing on the measurement results, where the reporting processing includes either of or a combination of differentiation and quantization, and sending measurement results obtained after the reporting processing to the network devices.

In this application, a terminal device reports the measurement results of the reference signals after the reporting processing. The reporting processing includes the differentiation and/or the quantization. In this way, a transmission quantity can be reduced, data transmission efficiency can be improved, and signaling overheads can be reduced.

With reference to the first aspect, in a possible implementation of the first aspect, the method further includes sending, to the network devices, information about a receive beam used to receive the reference signals, where the information about the receive beam includes characteristic information of the receive beam, and/or beam radiation mode information of the receive beam, where the beam radiation mode information is information used to describe a beam radiation mode of the receive beam.

A terminal device sends the information about the receive beam to the network devices. This helps the network devices analyze the measurement results reported by the terminal device, and orientations of the terminal device relative to the network devices can be estimated, so that AOD estimation accuracy can be improved.

With reference to the second aspect, in a possible implementation of the second aspect, the measurement results received from the terminal device are measurement results obtained after reporting processing. The reporting processing includes either of or a combination of differentiation and quantization.

In this application, the terminal device reports the measurement results of the reference signals after the reporting processing. The reporting processing includes the differentiation and/or the quantization. In this way, a transmission quantity can be reduced, data transmission efficiency can be improved, and signaling overheads can be reduced.

With reference to the second aspect, in a possible implementation of the second aspect, the method further includes receiving information that is about a receive beam used to receive the reference signals and that is sent by the terminal device. The information about the receive beam includes characteristic information of the receive beam, and/or beam radiation mode information of the receive beam. The beam radiation mode information is information that may indicate a beam radiation mode of the receive beam.

The terminal device sends the information about the receive beam to network devices. This helps the network devices analyze the measurement results reported by the terminal device, and orientations of the terminal device relative to the network devices can be estimated, so that AOD estimation accuracy can be improved.

Optionally, in some of the foregoing implementations, the characteristic information of the receive beam includes any one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to an earth coordinate system, and a sidelobe half-power width.

Optionally, in some of the foregoing implementations, the beam radiation mode information includes any one or more of an antenna and beam weight fitting parameter, a function fitting parameter, and beam gains of a beam at a plurality of angles.

Optionally, in some of the foregoing implementations, when the beam radiation mode information includes the beam gains of the beam at the plurality of angles, a sending manner of the beam radiation mode information is sending beam gains of the receive beam at the plurality of different angles in ascending order or descending order of angles, or sending beam gains of the receive beam at the plurality of different angles in descending order or ascending order of beam gains.

According to a third aspect, a measurement reporting method is provided. The method includes receiving reference signals from network devices based on beams, measuring the received reference signals to obtain measurement results, where the measurement results include reference signal received powers, receiving information about transmit beams from the network devices, and determining downlink angles of departure relative to the network devices based on the measurement results and the information about the transmit beams, where the information about the transmit beams includes characteristic information of the transmit beams, and/or beam radiation mode information of the transmit beams. The beam radiation mode information is information that may indicate beam radiation modes of the transmit beams.

According to a fourth aspect, a measurement reporting method is provided. The method includes sending reference signals to a terminal device based on beams, and sending information about transmit beams to the terminal device, where the information about the transmit beams includes characteristic information of the transmit beams, and/or beam radiation mode information of the transmit beams. The beam radiation mode information is information that may indicate beam radiation modes of the transmit beams.

Network devices send the information about the transmit beams to the terminal device. This helps analyze the measurement results of the reference signals for the devices, so that orientations of the terminal device relative to the network devices can be estimated, and AODs between the terminal device and the network devices can be estimated.

With reference to the third aspect or the fourth aspect, in a possible implementation of the third aspect or the fourth aspect, the characteristic information of the transmit beams includes any one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to an earth coordinate system, and a sidelobe half-power width.

With reference to the third aspect or the fourth aspect, in a possible implementation of the third aspect or the fourth aspect, the beam radiation mode information includes any one or more of an antenna and beam weight fitting parameter, a function fitting parameter, and beam gains of a beam at a plurality of angles.

With reference to the third aspect or the fourth aspect, in a possible implementation of the third aspect or the fourth aspect, when the beam radiation mode information includes the beam gains of the beam at the plurality of angles, a sending manner of the beam radiation mode information is sending beam gains of the transmit beam at the plurality of different angles in ascending order or descending order of angles, or sending beam gains of the transmit beam at the plurality of different angles in descending order or ascending order of beam gains.

With reference to the third aspect, in a possible implementation of the third aspect, the measurement results further include at least one of the following two items of information: channel phases of the reference signals and channel matrices of the reference signals.

With reference to the third aspect, in a possible implementation of the third aspect, the channel phases of the reference signals include phases on time domain paths on the reference signals, or phases determined based on phases of all reference signals within a measurement bandwidth.

With reference to the third aspect, in a possible implementation of the third aspect, the channel matrices of the reference signals include an inter-beam channel matrix, and/or an intra-beam channel matrix.

With reference to the third aspect, in a possible implementation of the third aspect, the intra-beam channel matrix includes a channel matrix determined on different time domain paths of a same reference signal, or a channel matrix determined on different frequency domain subbands of a same reference signal.

According to a fifth aspect, a communication apparatus is provided. The communication apparatus is configured to perform the method provided in the first aspect, the second aspect, the third aspect, or the fourth aspect.

Optionally, the communication apparatus may include a module configured to perform the method provided in the first aspect, the second aspect, the third aspect, or the fourth aspect.

According to a sixth aspect, a communication apparatus is provided. The communication apparatus includes a memory and a processor, the memory is configured to store instructions, the processor is configured to execute the instructions stored in the memory, and execution of the instructions stored in the memory enables the processor to perform the method provided in the first aspect, the second aspect, the third aspect, or the fourth aspect.

According to a seventh aspect, a chip is provided. The chip includes a processing module and a communication interface, the processing module is configured to control the communication interface to perform external communication, and the processing module is further configured to implement the method provided in the first aspect, the second aspect, the third aspect, or the fourth aspect.

According to an eighth aspect, a computer-readable storage medium is provided. The computer-readable storage medium stores a computer program. When the computer program is executed by a computer, the computer is enabled to implement the method provided in the first aspect, the second aspect, the third aspect, or the fourth aspect.

According to a ninth aspect, a computer program product including instructions is provided. When the instructions are executed by a computer, the computer is enabled to implement the method provided in the first aspect, the second aspect, the third aspect, or the fourth aspect.

According to a tenth aspect, a positioning system is provided, and includes the communication apparatus provided in the fifth aspect and configured to perform the method provided in the first aspect, and the communication apparatus provided in the fifth aspect and configured to perform the method provided in the second aspect.

The communication apparatus provided in the fifth aspect and configured to perform the method provided in the first aspect is referred to as a terminal device. The communication apparatus provided in the fifth aspect and configured to perform the method provided in the second aspect is referred to as a network device, for example, a serving base station.

The positioning system provided in the tenth aspect further includes a location management device.

According to an eleventh aspect, a positioning system is provided, and includes the communication apparatus provided in the fifth aspect and configured to perform the method provided in the third aspect, and the communication apparatus provided in the fifth aspect and configured to perform the method provided in the fourth aspect.

The communication apparatus provided in the fifth aspect and configured to perform the method provided in the third aspect is referred to as a terminal device. The communication apparatus provided in the fifth aspect and configured to perform the method provided in the fourth aspect is referred to as a network device, for example, a serving base station.

The positioning system provided in the eleventh aspect further includes a location management device.

Compared with the conventional technology, in this application, in addition to the received powers, the terminal device further reports at least one of the channel phases and the channel matrices, so that accuracy of AOD estimation can be improved.

DETAILED DESCRIPTION OF ILLUSTRATIVE EMBODIMENTS

The following describes technical solutions in this application with reference to the accompanying drawings.

Unless otherwise defined, all technical and scientific terms used in this specification have a same meaning as that usually understood by a person skilled in the art of this application. The terms used in the specification of this application are merely for the purpose of describing specific embodiments, and are not intended to limit this application.

Figure 1:
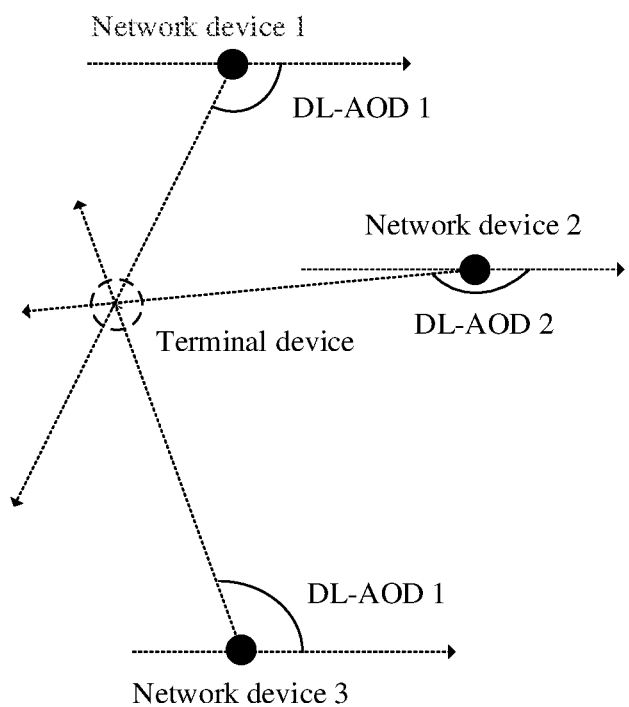
FIG. 1 is a schematic diagram of an application scenario according to an embodiment of this application.

As an example instead of a limitation, FIG. 1 is a schematic diagram of an application scenario according to an embodiment of this application.

FIG. 1 is a schematic conceptual diagram of positioning based on a downlink angle of departure (DL-AOD). Positioning of a terminal device may be implemented based on a DL-AOD 1, a DL-AOD 2, and a DL-AOD 3 of the terminal device relative to network devices 1, 2, and 3, and geographical positions of the network devices 1, 2, and 3. The network devices participating in the positioning of the terminal device may include one or more serving base stations and/or one or more neighboring base stations.

In a conventional technology, a DL-AOD estimation method is as follows. Network devices send reference signals to a terminal device in different beam directions. The terminal device measures RSRPs of a plurality of reference signals, and reports the RSRPs of the plurality of reference signals to the network devices. The network devices estimate DL-AODs relative to the terminal device based on the RSRPs reported by the terminal device.

In actual application, accuracy of the DL-AODs estimated by the network devices based only on the RSRPs reported by the terminal device is relatively low.

To address the foregoing problem, this application provides a measurement reporting method and an apparatus, to improve accuracy of DL-AOD estimation.

Hereinafter, a downlink angle of departure is abbreviated as AOD.

A beam-based multi-carrier communication system, for example, a 5th generation (5G) system, a new radio (NR) system, a machine to machine (M2M) communication system, an internet of vehicles system, another future-evolved communication system, or the like, is applicable to the embodiments of this application.

Figure 2:
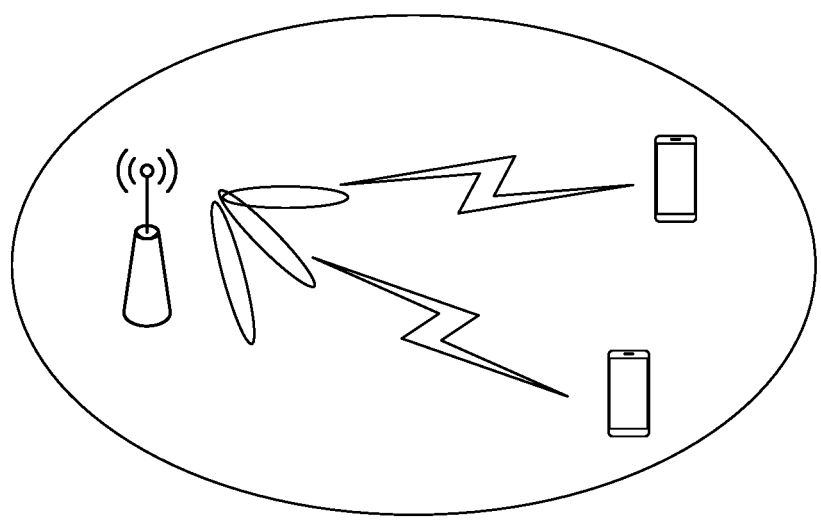
FIG. 2 is a schematic diagram of a communication system according to an embodiment of this application.

FIG. 2 is a schematic diagram of a communication system applicable to an embodiment of this application.

The communication system includes beam-based uplink (a terminal device to a network device) communication and beam-based downlink (the network device to the terminal device) communication.

According to a long term evolution (LTE) or NR protocol, at a physical layer, the uplink communication includes transmission of an uplink physical channel and an uplink signal.

The uplink physical channel includes a random access channel (RACH), a physical uplink control channel (PUCCH), a physical uplink shared channel (PUSCH), and the like.

The uplink signal includes a sounding reference signal (SRS), a physical uplink control channel demodulation reference signal (PUCCH-DMRS), a physical uplink shared channel demodulation reference signal (PUSCH-DMRS), an uplink phase noise tracking reference signal (PTRS), and an uplink positioning reference signal (PRS).

The downlink communication includes transmission of a downlink physical channel and a downlink signal.

The downlink physical channel includes a physical broadcast channel (PBCH), a physical downlink control channel (PDCCH), a physical downlink shared channel (PDSCH), and the like.

The downlink signal includes a primary synchronization signal (PSS), a secondary synchronization signal (SSS), a physical downlink control channel demodulation reference signal (PDCCH-DMRS), a physical downlink shared channel demodulation reference signal (PDSCH-DMRS), a phase noise tracking reference signal (PTRS), a channel state information reference signal (CSI-RS), a cell reference signal (CRS) (not in NR), a time/frequency tracking reference signal (TRS) (not in LTE), a positioning reference signal (positioning RS), and the like.

Figure 3:
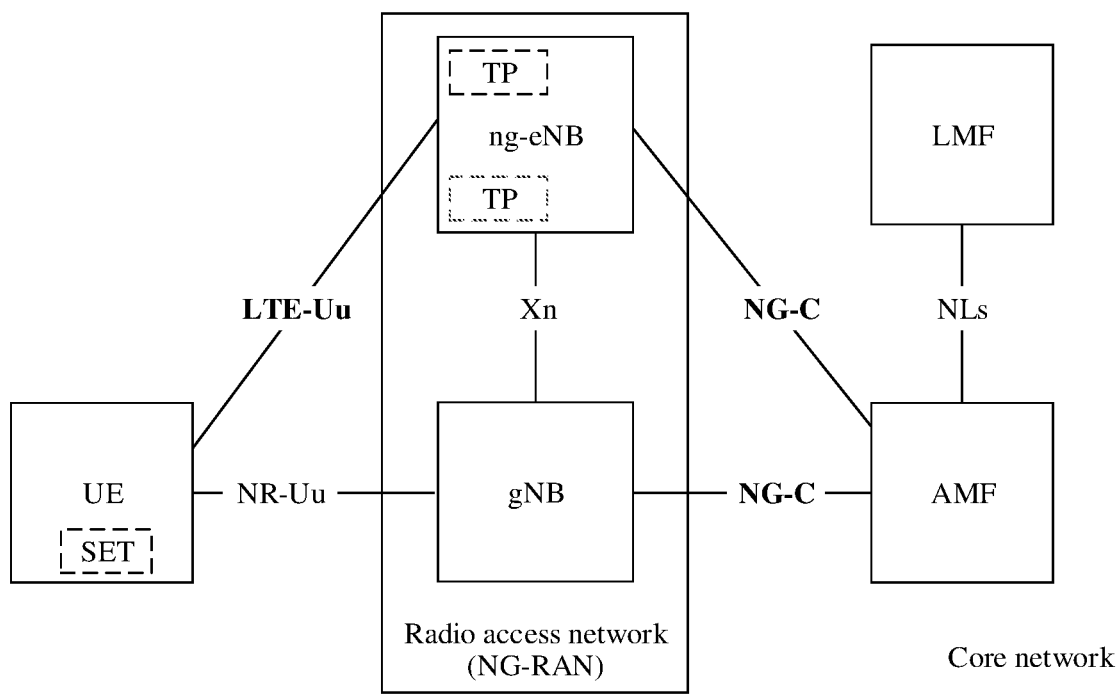
FIG. 3 and FIG. 4 are schematic diagrams of communication architectures applicable to an embodiment of this application.

FIG. 3 is a schematic diagram of a communication architecture applicable to an embodiment of this application. The communication architecture includes a terminal device (shown as UE in FIG. 3), a radio access network (an NG-RAN), and a core network.

The core network includes an access and mobility management function (AMF), a location management function (LMF), and other functions. The AMF functions as a gateway and the like, and the LMF functions as a positioning center and the like. The AMF and LMF are connected through an NLs interface.

The radio access network (NG-RAN) includes one or more next generation eNodeBs (ng-eNBs) and next generation NodeBs (gNBs). An ng-eNB indicates a long term evolution (LTE) base station that accesses the 5G core network, and a gNB indicates a 5G base station that accesses the 5G core network. Communication between an ng-eNB and a gNB, two ng-eNBs, or two gNBs is performed through an Xn interface. The Xn interface may also be referred to as an XnAP interface.

The radio access network is connected to the core network via the AMF through an NG-C interface.

The terminal device is connected to the radio access network via the ng-eNB through an LTE-Uu interface. The terminal device may be alternatively connected to the radio access network via the gNB through an NR-Uu interface.

The core network may directly communicate with the terminal device through an LPP/NPP protocol.

It should be understood that the communication architecture may include one or more base stations (including the ng-eNB and the gNB).

It should be further understood that the communication architecture may include one or more terminal devices, for example, one or more terminal device sets (for example, a UE set shown in FIG. 3).

One gNB may send data or control signaling to one or more terminal devices. A plurality of gNBs may simultaneously send data or control signaling to one terminal device.

Alternatively, the ng-eNB in FIG. 3 may be replaced with a transmission point (TP) (for example, a TP shown in FIG. 3).

Figure 4:
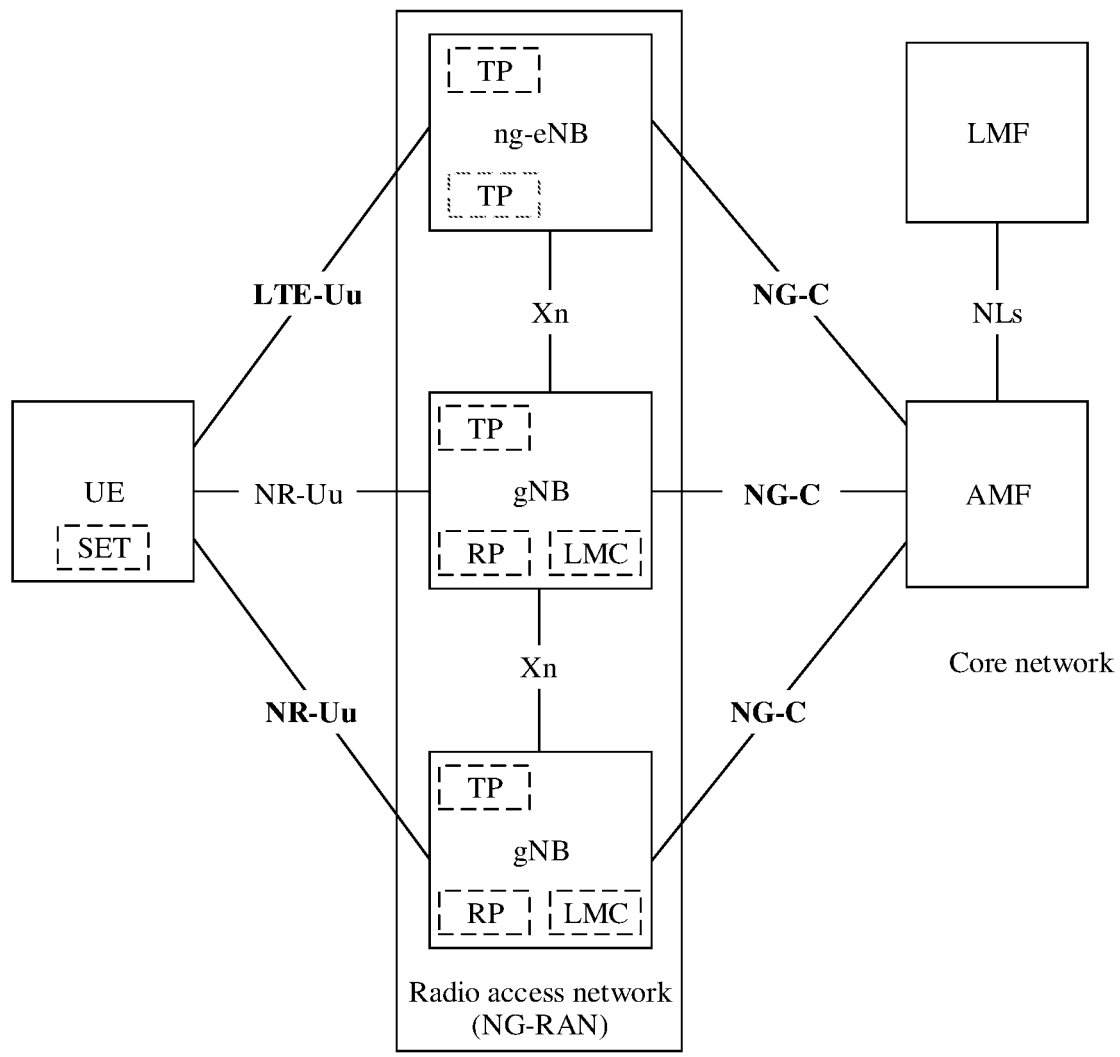

FIG. 4 is a schematic diagram of another communication architecture applicable to an embodiment of this application. Different from the communication architecture shown in FIG. 3, in the communication architecture shown in FIG. 4, a location management component (LMC) is added to a gNB, and the LMC may perform some functions of an LMF. To implement the functions that are of the LMF and that can be implemented by the LMC, a radio access network does not need to access a 5G core network via an AMF. For example, when the communication architecture is used, the gNB does not need to report, to the core network, measurement results reported by a terminal device, so that signaling overheads can be reduced, and a transmission delay can be reduced. For example, in the positioning scenario shown in FIG. 1, positioning efficiency may be improved.

Descriptions of other parts shown in FIG. 4 are the same as those in FIG. 3, and details are not described again.

For example, in FIG. 3 or FIG. 4, the UE is a terminal device to be positioned. The gNB or eNB is a serving base station or a neighboring base station. The LMF or the LMC is a positioning service center, configured to collect measurement information reported by the base stations and the UE and position information of the base stations, and further configured to perform position calculation based on the measurement information and positions of the base stations, to determine a position of the UE.

The terminal device in the embodiments of this application includes a handheld device, a vehicle-mounted device, a wearable device, or a computing device that has a wireless communication function. For example, the terminal device may be user equipment (UE), an access terminal, a subscriber unit, a subscriber station, a mobile station, a remote station, a remote terminal, a mobile device, a user terminal, a terminal, a wireless communication apparatus, a user agent, a user apparatus, a handheld device having a wireless communication function, a computing device, another processing device connected to a wireless modem, a vehicle-mounted device, a wearable device, a terminal device in a 5G network, a terminal device in a future evolved public land mobile network (PLMN), or the like. For example, the terminal device may be a mobile phone, a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like.

The network device in the embodiments of this application may be configured to communicate with one or more terminal devices, or may be configured to communicate with one or more base stations having some terminal functions (for example, communication between a macro base station and a micro base station, such as an access point). The network device may be referred to as a base station. The base station may be in a plurality of forms, for example, a macro base station, a micro base station, a relay station, and an access point. For example, the network device in the embodiments of this application may be a base station in new radio (NR), or may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in a long term evolution (LTE) system. A base station in 5G NR may also be referred to as a transmission reception point (TRP) or a next-generation NodeB (gNB). The network device in the embodiments of this application may be the gNB or the eNB shown in FIG. 3 or FIG. 4, or may be the LMF.

To better understand the embodiments of this application, the following describes concepts in the embodiments of this application first.

1. Beam

The beam is a communication resource. The beam may be a wide beam, a narrow beam, or a beam of another type. A technology for forming the beam may be a beamforming technology or another technology. The beamforming technology may be specifically a digital beamforming technology, an analog beamforming technology, or a hybrid digital/analog beamforming technology. Different beams may be considered as different resources. Same information or different information may be sent on different beams. Optionally, a plurality of beams having a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It can be understood that the one or more antenna ports forming the beam may alternatively be considered as one antenna port set. In a protocol, the beam can also be embodied as a spatial filter.

2. Antenna Panel

Signals in wireless communication need to be received and sent through antennas, and a plurality of antenna elements may be integrated on one panel. One radio frequency link may drive one or more antenna elements. In the embodiments of this application, a terminal device may include a plurality of antenna panels, and each antenna panel includes one or more beams. A network device may also include a plurality of antenna panels, and each antenna panel includes one or more beams. The antenna panel may also be represented as an antenna array or an antenna subarray. One antenna panel may include one or more antenna arrays/subarrays. One antenna panel may be controlled by one or more oscillators. The radio frequency link may also be referred to as a receive channel and/or a transmit channel, a receiver branch, or the like. One antenna panel may be driven by one radio frequency link, or may be driven by a plurality of radio frequency links. Therefore, the antenna panel in the embodiments of this application may alternatively be replaced with a radio frequency link, a plurality of radio frequency links driving one antenna panel, or one or more radio frequency links controlled by one oscillator.

3. Beam Radiation Mode

Figure 5:
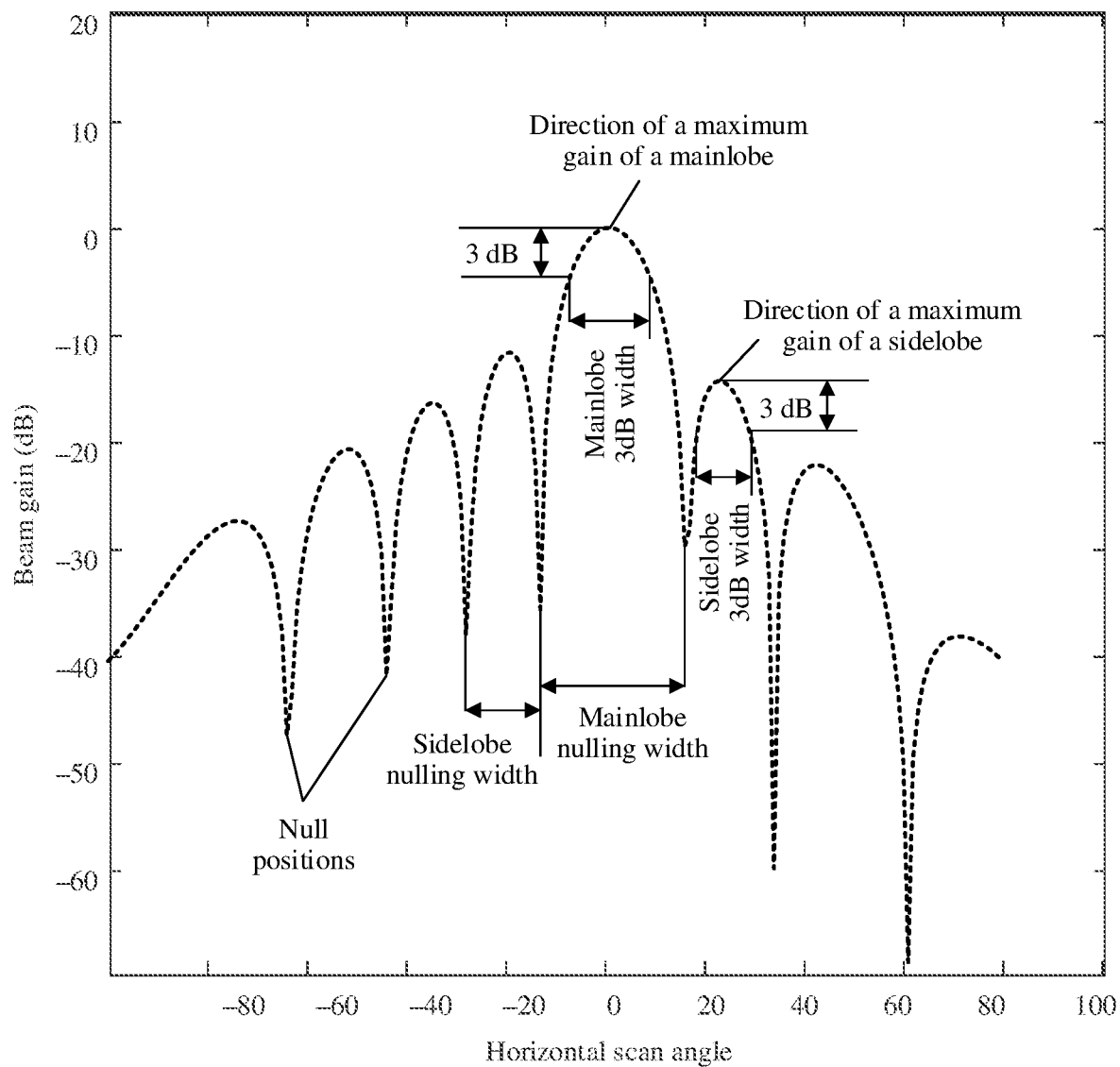
FIG. 5 is a schematic diagram of a beam gain mode.

The beam radiation mode indicates a beam gain of a beam in each of different horizontal and vertical directions. As shown in FIG. 5, the beam radiation mode has the following five characteristics. (1) Beam 3 dB width: A width between two points at which a radiation intensity decreases by 3 dB (a power density decreases by half) compared with a radiation intensity in a direction (a mainlobe radiation direction) of maximum gain of a beam is defined as the beam 3 dB width (a lobe width). (2) A mainlobe/sidelobe nulling width is an angle between beam gains that are null on both sides of a direction of maximum gain of a beam mainlobe/sidelobe. (3) A mainlobe/sidelobe gain direction is an angle corresponding to a direction of maximum gain of a beam mainlobe/sidelobe. (4) Sidelobe 3 dB width: An angle between two points at which a radiation intensity decreases by 3 dB (a power density decreases by half) compared with a radiation intensity in a direction of maximum gain of a sidelobe is defined as the sidelobe 3 dB width (a sidelobe width). (5) Null positions are angles corresponding to beam gains that are null on both sides of a direction of maximum gain of a beam.

Usually, a pattern has two or more lobes. A lobe with a maximum radiation intensity is referred to as a mainlobe, another lobe is referred to as a minor lobe or sidelobe, and a sidelobe in a direction opposite to the mainlobe is referred to as a back lobe. An angle between two points at which a radiation intensity decreases by 3 dB (a power density decreases by half) on both sides of a direction of maximum radiation of the mainlobe is defined as the lobe width. The lobe width may also be referred to as a beam width, a mainlobe width, or a half-power beamwidth (HPBW).

4. Bandwidth Part (BWP)

5G frequencies are classified into FR1 (f<6 GHz) and FR2 (f>6 GHz). Bandwidths in the FR1 may be 5 MHz, 10 MHz, 15 MHz, 20 MHz, 25 MHz, 30 MHz, 40 MHz, 50 MHz, 60 MHz, 80 MHz, and 100 MHz. Bandwidths in the FR2 may be 50 MHz, 100 MHz, 200 MHz, and 400 MHz. The FR1 may be referred to as a low frequency, and the FR2 may be referred to as a high frequency or millimeter wave.

It can be learned that a minimum bandwidth in 5G may be 5 MHz and a maximum bandwidth is up to 400 MHz. If all terminal devices are required to support the maximum bandwidth of 400 MHz, there is undoubtedly a relatively high requirement on performance of the terminal devices, and costs of the terminal devices are increased. In addition, one terminal device cannot occupy an entire 400 MHz bandwidth. If the terminal device uses a sampling rate corresponding to the 400 MHz bandwidth, performance is undoubtedly wasted. In addition, a large bandwidth means a high sampling rate, and the high sampling rate means high power consumption.

In this case, it is proposed in NR that a bandwidth of a terminal device can dynamically change. For example, when a traffic volume of the terminal device is relatively heavy, a system configures a large bandwidth (BWP 1) for the terminal device. When the traffic volume of the terminal is relatively small, the system configures a small bandwidth (BWP 2) for the terminal to meet a basic communication requirement.

In a corresponding BWP, the terminal device only needs to use a center frequency and a sampling rate of the corresponding BWP. Each BWP has a different frequency and bandwidth, and may correspond to a different configuration. For example, a subcarrier spacing, a cyclic prefix (CP) type, a synchronization signal/physical broadcast channel block (SS/PBCH block) periodicity, and the like of each BWP may be configured differently to adapt to different services. The synchronization signal/physical broadcast channel block (SS/PBCH block) may be abbreviated as synchronization signal block (SSB).

Reference signals in the embodiments of this application are all downlink reference signals.

Figure 6:
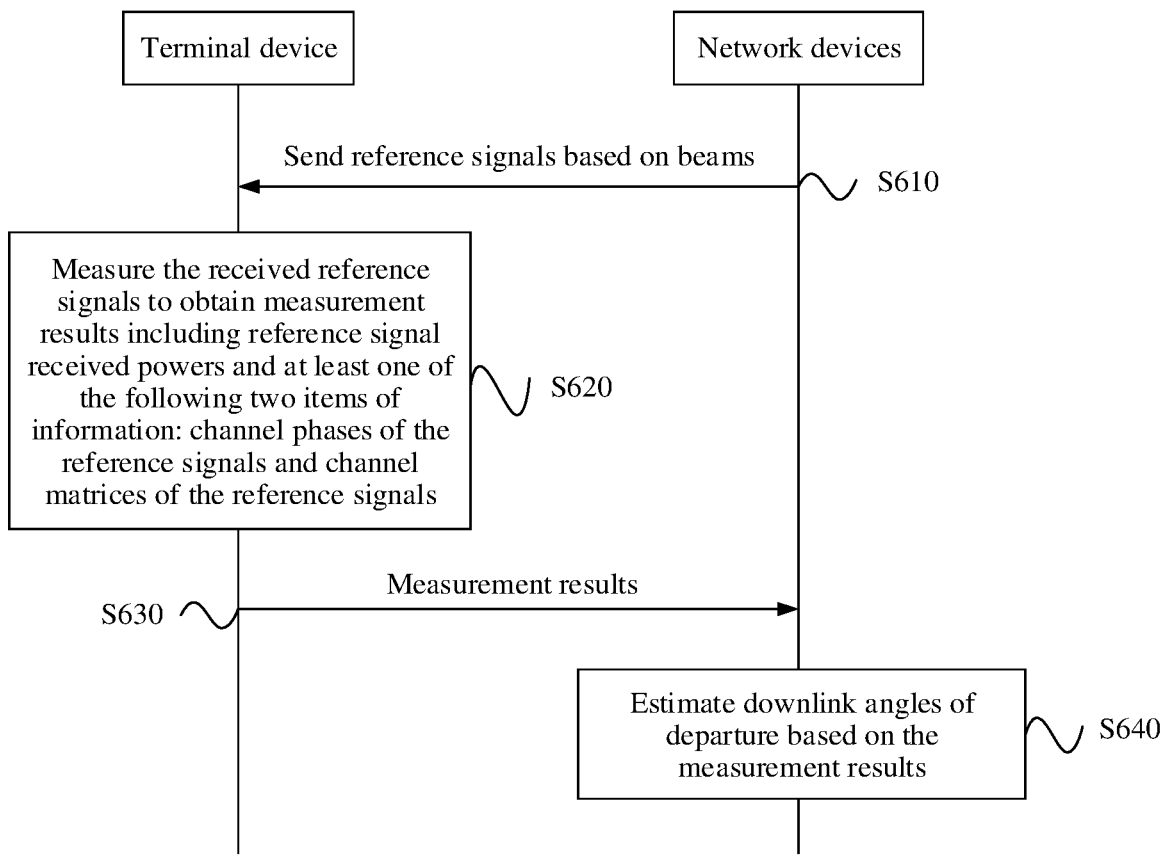
FIG. 6 is a schematic interaction diagram of a measurement reporting method according to an embodiment of this application.

FIG. 6 is a schematic interaction diagram of a measurement reporting method 600 according to an embodiment of this application. The method 600 includes the following steps.

S610: Network devices send reference signals to a terminal device based on beams.

The network devices send a plurality of reference signals to the terminal device based on the beams.

S620: After receiving the reference signals, the terminal device measures the received reference signals to obtain measurement results.

The measurement results include reference signal received powers (RSRPs) and at least one of the following two items of information: channel phases of the reference signals and channel matrices of the reference signals.

The terminal device may measure all the received reference signals, or may measure a part of the received reference signals.

The channel phases of the reference signals indicate related information about phases of channels through which the reference signals delivered by the network devices pass.

The channel matrices of the reference signals indicate related information about channel matrices of the channels through which the reference signals delivered by the network devices pass.

The measurement results are described below.

S630: The terminal device sends the measurement results to the network devices.

For the measured reference signals, the terminal device may report measurement results of all the reference signals, or may report measurement results of a part of the reference signals. For example, when N reference signals are measured, measurement results of only the first M reference signals in descending order of received powers are reported, where N is an integer greater than 1, and M is a positive integer less than or equal to N.

S640. The network devices estimate AODs based on the measurement results.

It should be understood that after the AODs of the terminal device relative to a plurality of network devices are obtained, positioning of the terminal device may be implemented.

It should be understood that channel phases of channels for transmitting the reference signals may represent information about time points at which a receive end (namely, the terminal device) receives the reference signals. Therefore, the channel phases help the network devices estimate AODs, and to some extent, accuracy of AOD estimation can be improved.

It should be further understood that channel matrices of the channels for transmitting the reference signals also help the network devices estimate relatively accurate AODs.

Compared with a conventional technology, in this application, in addition to the received powers, the terminal device further reports at least one of the channel phases and the channel matrices, so that accuracy of AOD estimation can be improved.

The measurement results include the reference signal received powers (referred to as the received powers below). The received powers may be determined based on reference signals within a measurement bandwidth. The measurement bandwidth may be any one of a current working downlink BWP bandwidth of the terminal device, a bandwidth of a dedicated BWP used for positioning, or a bandwidth that is of current reference signals and that is configured by the network device.

In an implementation, the received powers include average powers of positioning reference signals on all resource elements (REs) within a bandwidth.

In another implementation, the received powers include a total power of reference signals within a bandwidth range.

In still another implementation, the received powers include powers of all paths of the reference signals in time domain, powers of maximum M paths of the reference signals in time domain, powers of M paths that are of the reference signals in time domain and on which reference signals first arrive at the receive end, or powers of M paths that are of the reference signals in time domain and that are determined by the terminal device, where a value of M may be configured by the network devices or agreed upon in a protocol.

Optionally, the received powers in this specification may be replaced with amplitudes.

The measurement results further include the channel phases of the reference signals (referred to as the channel phases below).

Optionally, the channel phases may include a phase determined based on all resource elements (REs) of a same reference signal in the measurement bandwidth.

For example, the channel phases include a bandwidth phase determined based on powers and corresponding phases of a reference signal on REs at which the reference signal is located.

For another example, the channel phases include a phase determined according to averaging or weighted averaging on phases of frequencies in the measurement bandwidth. For example, weighted averaging is performed on estimated channel phases corresponding to REs.

Optionally, the channel phases include phases of paths of the N reference signals in time domain, and N is a positive integer.

Optionally, the channel phases include phases of first paths of the N reference signals, and N is a positive integer.

For example, the terminal device measures phases of M paths of the N reference signals in time domain, and may report phases of all or a part of the M paths, where N is a positive integer, and a value of M may be configured by the network devices or agreed upon in a protocol.

Optionally, in some embodiments, the measurement results include the channel phases of the reference signals, and the channel phases include phases of a plurality of paths of one or more reference signals in time domain. The measurement results may further include path delays between a plurality of groups of phase results, where each group of phase results refers to one or more phases of the one or more reference signals on a same time domain path.

It should be noted that the bandwidth mentioned in this specification may be a full bandwidth or a bandwidth part.

For example, the network devices configure several frequency subbands for the terminal device, and the terminal device reports received powers, and channel phases and/or channel matrices in the frequency subbands.

It should be noted that the channel phases of the reference signals may be obtained or defined in another feasible manner, and this also falls within the protection scope of this application.

The measurement results further include the channel matrices of the reference signals (referred to as the channel matrices below). In different application scenarios, the channel matrices may be vectors, or may be matrices obtained by calculating covariances of vectors.

Optionally, the channel matrices include an inter-beam channel matrix and/or an intra-beam channel matrix.

The inter-beam channel matrix may be a channel vector of N reference signals, or may be an N-dimensional matrix obtained by calculating an inner product on the channel vector, where N is a positive integer.

For example, the terminal device selects reporting quantities from the N reference signals, and jointly determines the reporting quantities of the N reference signals as an N-dimensional vector (namely, the channel vector). The terminal device reports the vector in the measurement results, where N is a positive integer. For example, N is 1 or an integer greater than 1.

For another example, the terminal device selects reporting quantities from the N reference signals, and jointly determines the reporting quantities of the N reference signals as a vector. The terminal device calculates an inner product on the vector of the N reference signals, to obtain an N*N matrix (namely, the channel matrix). The terminal device reports the matrix in the measurement results.

The reporting quantities may be the received powers or the channel phases described above. In other words, the reporting quantities may be determined by using the method for determining the received powers or the channel phases of the reference signals described above.

For example, the terminal device selects powers of paths of the N reference signals in time domain as the reporting quantities.

Alternatively, the terminal device selects powers of maximum M paths of the N reference signals in time domain as the reporting quantities.

Alternatively, the terminal device selects phases of first paths of the N reference signals in time domain as the reporting quantities.

Alternatively, the terminal device selects phases of M paths in time domain paths of the N reference signals as the reporting quantities.

It should be noted that, in an embodiment in which the measurement results include the channel matrices of the reference signals, in a process of determining the reporting quantities of a plurality of reference signals, path selection of different reference signals in time domain has the following constraints.

Constraint 1: A same rule is used to select the reporting quantities for the plurality of different reference signals. The rule may be about a path, or about time domain, or about a bandwidth.

In an example, it is assumed that reporting quantities of three reference signals (denoted as an RS 1, an RS 2, and an RS 3) need to be determined.

For example, if a power of a first path in time domain is selected as the reporting quantity for the RS 1, a power of a first path in time domain also needs to be selected as the reporting quantity for each of the RS 2 and the RS 3.

For another example, if an average power of the RS 1 on REs in a bandwidth range is selected as the reporting quantity for the RS 1, an average power of each of the RS 2 and the RS 3 on REs in a bandwidth range also needs to be selected as the reporting quantity for each of the RS 2 and the RS 3. If the bandwidth range of the RS 1 is a full bandwidth, the bandwidth ranges of the RS 2 and the RS 3 are also each a full bandwidth.

Constraint 2: The plurality of different reference signals have a same parameter.

For example, a same subband is used between the plurality of different reference signals.

For another example, a path determined based on a same delay is used between the plurality of different reference signals.

For another example, a same receive beam is used between the plurality of different reference signals.

The following describes the intra-beam channel matrix.

Optionally, the intra-beam channel matrix is a channel matrix obtained by calculating a covariance of channel vectors on N different time domain paths of a reference signal, and N is a positive integer.

For example, for each beam, one or more paths, for example, M paths, may be determined. An intra-beam covariance is calculated based on phases and received powers of the M paths, to obtain the intra-beam channel matrix.

Optionally, the intra-beam channel matrix is a channel matrix determined by calculating a covariance of channel vectors on N different frequency domain subbands of a reference signal, and N is a positive integer.

For example, in frequency domain, a subband power and a phase are determined on a per-subband basis. A covariance between different subbands of a same beam is calculated based on subband powers and phases, to obtain an intra-beam channel matrix.

Optionally, in an embodiment in which the channel matrices include the inter-beam channel matrix and the intra-beam channel matrix, one N-dimensional reporting vector is determined for each beam, and one M*N matrix is jointly reported for M beams.

It should be noted that, channel vectors (or channel matrices) that are of different reference signals and that are reported at a same index position need to meet the constraint 1 and the constraint 2 described above. For details, refer to the foregoing descriptions.

For example, the second reporting quantity of a beam a (which may also be considered as a reference signal a) and the second reporting quantity of a beam b (which may also be considered as a reference signal b) meet the constraint 1 and the constraint 2 described above.

In an embodiment in which the channel matrices include the inter-beam channel matrix and/or the intra-beam channel matrix, a reporting manner of the channel matrices may be in a matrix form, or may not be in a matrix form.

For example, a reporting form of the channel matrices is index information+a reporting quantity. The index information may be a position in a vector, a subband index, a delay index, a delay amount, or the like.

In this application, in addition to the reference signal received powers, the terminal device further reports at least one of the following two items of information: the channel phases of the reference signals and the channel matrices of the reference signals. The information enables the network devices to learn of more information about correlation between beams, and can facilitate the network devices in obtaining relatively accurate AODs.

It should be noted that the channel matrices of the reference signals may be obtained or defined in another feasible manner, and this also falls within the protection scope of this application.

In step S630, the terminal device sends the measurement results to the network devices. Optionally, the terminal device may perform report processing on the measurement results, and then report measurement results obtained after the reporting processing to the network devices.

The reporting processing may include either of or a combination of quantization and differentiation.

Quantization processing is described below.

In the measurement results, the quantization processing may be performed on the received powers and the channel phases.

The network devices may configure quantization-related parameters such as a quantization range, a quantization precision, and a quantization manner.

Optionally, the quantization range may include a multi-order quantization range.

For example, a user needs to report N values. Relatively large L values may be quantized by using quantization precision of a large step, and remaining N-L values may be quantized by using quantization precision of a small step.

For example, for the received powers, the multi-order quantization range may be used.

Optionally, the quantization range may include an even quantization range.

For example, a quantization scale may be evenly set for the channel phase ranging from 0 to $2\pi$.

In conclusion, the network devices may configure a plurality of different quantization precisions. Correspondingly, the terminal device may quantize the measurement results by using different quantization precisions.

The quantization processing may also be performed on the channel matrices.

For example, each element in the channel matrices is quantized in a manner of performing quantization processing on the received powers and the phases.

For another example, each row or each column in the channel matrices is quantized and then reported based on a difference between each row or each column and the first row or column.

For another example, singular value decomposition (SVD) is performed on the channel matrices, and an eigenvalue or an eigenvector obtained through decomposition is quantized and then reported.

Differential processing is described below.

The differential processing means that in N reporting quantities, for one (denoted as a reporting quantity A) of the reporting quantities, a measured value of the reporting quantity A is reported, and for each of other N-1 reporting quantities, a difference between a measured value of each of other N-1 reporting quantities and the measured value of the reporting quantity A is reported.

For example, the reporting quantity A is usually a reporting quantity with a maximum measurement value in the N reporting quantities.

The received powers are used as an example. The differential processing means that in received powers of the N reference signals, for one (denoted as a first received power) of the received powers of the reference signals, a measured value of the first received power is reported, and for each of received powers of other N-1 reference signals, a difference between a measured value of each of received powers of other N-1 reference signals and the measured value of the first received power is reported.

The channel phases are used as an example. The differential processing means that in channel phases of the N reference signals, for a channel phase (denoted as a first channel phase) of a reference signal with a maximum received power, a measured value of the first channel phase is reported, and for each of channel phases of other N-1 reference signals, a difference between a measured value of each of channel phases of other N-1 reference signals and the measured value of the first channel matrix is reported.

In other words, for a reference signal with a maximum received power (RSRP), a reporting quantity of a phase (or a received power) of the reference signal is a measured value of the phase (or the received power) of the reference signal. For other reference signals, a reporting quantity of a phase (or a received power) of each of other reference signals is a difference between the phase (or the received power) of each of other reference signals and the phase (or the received power) of the reference signal with the maximum received power.

Optionally, in a possible implementation, the received powers mentioned in this specification may be replaced with amplitudes.

Optionally, the reporting processing is performing the quantization processing on the measurement results.

Optionally, the reporting processing is performing the differential processing on the measurement results.

Optionally, the reporting processing is first performing the differential processing on the measurement results, and then performing the quantization processing on differential processing results.

For example, the phase (or the received power) of the reference signal with the maximum received power (RSRP) is used as a reference, and the phase (or the received power) of each of other reference signals is quantized based on a difference between the phase (or the received power) of each of other reference signals and the reference.

It should be understood that, in this application, the terminal device reports the measurement results of the reference signals after the reporting processing. The reporting processing includes the differentiation and/or the quantization. In this way, a transmission quantity can be reduced, data transmission efficiency can be improved, and signaling overheads can be reduced.

Optionally, in some embodiments, the terminal device further reports information about a receive beam to the network devices. In other words, the terminal device reports the information about the receive beam along with reporting the measurement results.

For example, the terminal device may report the measurement result and the information about the receive beam on a same message.

Alternatively, the terminal device may separately report the measurement result and the information about the receive beam on two messages.

The information about the receive beam refers to beam-related information on a terminal device side.

For example, a beam indicated by the information about the receive beam may use downlink reference signals received by the beam as an index.

Optionally, the information about the receive beam indicates information about a beam set of the terminal device.

Optionally, the information about the receive beam is information about a receive beam of reference signals whose measurement results are to be reported by the terminal device.

It should be understood that, the terminal device sends the information about the receive beam to the network devices. This helps the network devices analyze the measurement results reported by the terminal device, and orientations of the terminal device relative to the network devices can be estimated, so that AOD estimation accuracy can be improved.

The information about the receive beam may be determined based on weights of receive spatial filters of the downlink reference signals.

The information about the receive beam may include characteristic information of the receive beam and/or beam radiation mode information of the receive beam.

The beam radiation mode information is information that may indicate a beam radiation mode of the receive beam. Descriptions are provided below.

Optionally, the information about the receive beam may include characteristic information of a receive beam of the terminal device.

The characteristic information may accurately describe some characteristics of the receive beam. For example, the characteristic information of the receive beam may include any one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to an earth coordinate system, and a sidelobe half-power width.

Optionally, the information about the receive beam may include beam radiation mode information of the terminal device.

The beam radiation mode information is information that may indicate a beam radiation mode of the receive beam of the terminal device.

A concept of a beam radiation mode is as described above with reference to FIG. 5.

The beam radiation mode information includes any one or more of an antenna and beam weight fitting parameter, a function fitting parameter, and beam gains of a beam at a plurality of angles.

Optionally, the beam radiation mode information includes the antenna and weight fitting parameter. In other words, the beam radiation mode information describes the beam radiation mode from a perspective of an antenna and a weight of the terminal device.

For example, the antenna and weight fitting parameter includes any one or more of a quantity of antennas, a quantity of antennas on an antenna panel (for example, a quantity of antenna array elements in a horizontal dimension and a quantity of antenna arrays in a vertical dimension), an antenna panel orientation, a weight value of each beam, and a half-power beamwidth (HPBW) of each antenna array element.

The antenna panel orientation may be a relative orientation of the panel. For example, a normal direction of a panel is an x-axis, and normal directions of other panels are orientations (a scan angle and a pitch angle) relative to the x-axis.

The weight value of each beam may be a discrete Fourier transform (DFT) weight, or a weight number identifier agreed upon by a receiver and a transmitter.

In an example of the DFT weight, a weight of a $k^{th}$ beam is (k=0, 1, ..., N-1), and a weight of an $n^{th}$ antenna of an array element whose horizontal or vertical length is N is $$e^{-1\frac{2\pi}{N}kn}.$$

For example, the terminal device may feed back a two-dimensional index (k, l), indicating that a $k^{th}$ weight (vector $a_k$) in a horizontal dimension and an $l^{th}$ weight (vector $b_l$) in a vertical dimension are used. A combined weight c=kron($a_k$, $b_l$) is formed, where kron represents a Kronecker product.

Optionally, the beam radiation mode information includes the function fitting parameter. In other words, the beam radiation mode information describes the beam radiation mode from a perspective of a function form of the beam radiation mode of the terminal device.

For example, it is assumed that the beam radiation mode of the terminal device may be described (or may be referred to as fitted) by using a function f(a, b, c), and the function fitting parameter includes parameters a, b, and c.

For example, the beam radiation mode of the terminal device may be fitted by using a quadratic function y=ax^2+bx+c, and the beam radiation mode information reported by the terminal device includes function fitting parameters a, b, and c.

It should be noted that the function f(a, b, c) and the quadratic function y=ax^2+bx+c are merely examples instead of limitations, and a form of the fitting function of the beam radiation mode is not limited in this application.

For example, piecewise fitting may alternatively be performed on the beam radiation mode based on null points. In this case, the beam radiation mode information reported by the terminal device may include a mainlobe fitting parameter, null positions, and a sidelobe fitting parameter.

Optionally, the beam radiation mode information includes the beam gains of the beam at the plurality of angles. In other words, the beam radiation mode information describes the beam radiation mode of the terminal device from a perspective of the beam gains of the beam at the plurality of angles.

The terminal device may report the beam gains of the beam at the plurality of angles in a plurality of manners.

In a possible manner, one beam is used as an example. The terminal device reports beam gains of the beam at a plurality of angles in ascending order or descending order of scan angles.

For example, in FIG. 5, six beams are included. For each beam, the terminal device reports a plurality of groups of [a horizontal scan angle, a beam gain] of the beam, for example, [0°, a beam gain 1], [30°, a beam gain 2], [60°, a beam gain 3], [90°, a beam gain 4], and [120°, a beam gain 5].

In another possible manner, one beam is still used as an example. The terminal device reports, in descending order or ascending order of beam gains of the beam, a finite quantity of beam gains of the beam and scan angles corresponding to the beam gains.

For example, for one beam, the terminal device reports [a maximum beam gain, a scan angle 1], [a second maximum beam gain, a scan angle 2], and the like of the beam.

For example, for one beam, the terminal device reports [a beam gain corresponding to a highest peak, a scan angle 1], [a beam gain corresponding to a second highest peak, a scan angle 2], [a beam gain corresponding to a third highest peak, a scan angle 3], ..., and [a beam gain corresponding to a lowest trough, a scan angle x] of the beam.

In another example, for one beam, the terminal device reports [a beam gain corresponding to a highest peak, a scan angle 1], [a beam gain corresponding to a second highest peak, a scan angle 2], [a beam gain corresponding to a third highest peak, a scan angle 3], ..., and [a group of null scan angles x1, x2, and the like closest to the highest peak] of the beam.

In still another example, for one beam, the terminal device reports [a beam gain corresponding to a highest peak, a scan angle 1, an included angle 1 of a beam 3 dB width of the highest peak], [a beam gain corresponding to a second highest peak, a scan angle 2, an included angle 2 of the beam 3 dB width of the highest peak], [a beam gain corresponding to a third highest peak, a scan angle 3, an included angle 3 of the beam 3 dB width of the highest peak], and the like of the beam.

Optionally, the foregoing angle may be extended to angles in two dimensions: horizontal and vertical.

Optionally, except the highest peak, beam gains corresponding to other peaks may be reported after normalization is performed by using the beam gain corresponding to the highest peak.

It should be noted that the manners of reporting the beam gains of the beam at the plurality of angles described above are merely examples rather than a limitation. In actual application, the beam gains of the beam at the plurality of angles may be reported in another feasible manner based on a specific requirement. For example, the beam gains of the beam at the plurality of angles are reported in an out-of-order manner for a scan angle. Alternatively, the beam gains of the beam at the plurality of angles are reported in an out-of-order manner for a beam gain.

It should be noted that the beam radiation mode information in this application refers to information used to describe the beam radiation mode of the terminal device, so that after receiving the beam radiation mode information, the network devices can estimate the beam radiation mode of the terminal device to some extent. The beam radiation mode information does not mean an actual implementation of a beam of the terminal device. Alternatively, the beam radiation mode information may be understood as a parameter that may represent beam gain distribution of the terminal device. However, the beam radiation mode information does not limit an actual beam design manner on the terminal device side.

It should be noted that the foregoing describes several types of beam radiation mode information, and these are merely examples rather than a limitation. In actual application, another feasible manner may be used to describe the beam radiation mode of the terminal device.

In this application, the terminal device sends the information about the receive beam to the network devices. This helps the network devices analyze the measurement results reported by the terminal device, and orientations of the terminal device relative to the network devices can be estimated, so that AOD estimation accuracy can be improved.

In step S610, the terminal device receives, based on reference signal configuration information, the reference signals delivered by the network devices. The reference signal configuration information includes information used to indicate time-frequency resources of the reference signals, or may further include information used to indicate a sequence of the reference signals.

The reference signal configuration information may be configured by the network devices for the terminal device. For example, before step S610, the method 600 further includes the network devices configure the reference signal configuration information for the terminal device, in other words, the network devices send the reference signal configuration information to the terminal device.

The reference signal configuration information may include any one or more of a bandwidth, a receive beam indication, a sequence, and a density. Configuration of the reference signals is not limited in this application.

The network devices may further configure corresponding reference signal identifiers for the reference signals.

Optionally, the network devices may configure the reference signals in a set form.

For example, the network devices may configure one set beam indicator for an entire reference signal set, and content indicated by the set beam indicator is one downlink reference signal. After receiving the beam set indicator, the terminal device receives the entire reference signal set by using a receive beam for receiving the downlink reference signal. The downlink reference signal in this example may be referred to as a reference signal set beam indication reference signal.

For reference signal receiving, the terminal device may receive a group of reference signals by using a fixed receive beam.

Optionally, the group of reference signals may be specified by the network devices.

For example, when configuring the reference signals, the network devices configure some reference signals into a group.

Optionally, the group of reference signals may alternatively be determined by the terminal device.

For example, the terminal device considers reference signals in a same cell as a group of reference signals, or considers reference signals in a same reference signal set as a group of reference signals, or considers reference signals overlapping a currently active downlink bandwidth part (BWP) of the terminal device as a group of reference signals. It should be noted that the overlapping mentioned herein may refer to completely overlapping, or may refer to including or being greater than an overlapping bandwidth of a plurality of reference signals.

In step S620, the terminal device may measure the received reference signals based on the measurement configuration information. The measurement configuration information includes information used to indicate measurement quantities.

The measurement configuration information may be configured by the network devices for the terminal device. For example, before step S620 or step S610, the method 600 may further include the network devices configure the measurement configuration information for the terminal device, in other words, the network devices send the measurement configuration information to the terminal device.

The measurement configuration information includes the information indicating the measurement quantities. The measurement quantities include reference signal received powers, and further include at least one of the following two items of information: channel phases of the reference signals and channel matrices of the reference signals.

Optionally, the measurement quantities further include information about the receive beam of the terminal device.

The reference signal received power, the channel phases of the reference signals, the channel matrices of the reference signals, and the information about the receive beam mentioned herein respectively correspond to the reference signal received power, the channel phases of the reference signals, the channel matrices of the reference signals, and the information about the receive beam described above. For specific descriptions, refer to the foregoing descriptions. Details are not described herein again.

In step S630, the terminal device may send the measurement results to the network devices based on reporting configuration information. The reporting configuration information is used to indicate reported content, or may further indicate a reporting manner.

The reporting configuration information may be configured by the network devices for the terminal device. For example, before step S630, or before step S620, or before step S610, the method 600 may further include the network devices configure the reporting configuration information for the terminal device, in other words, the network devices send the reporting configuration information to the terminal device.

Optionally, the reporting configuration information is used to indicate any one or more of a quantity of receive beams that need to be reported, a beam index of reference signals that need to be measured, related information about a covariance that needs to be reported, a bandwidth or a first path phase that needs to be reported, information about a reporting processing manner, and information about a reporting manner of the information about the receive beam.

The information about the reporting processing manner is used to indicate the terminal device to perform differential processing and/or quantization processing on the measurement results and then report measurement results.

Optionally, the information about the reporting processing manner may further include quantization configuration information.

For example, the quantization configuration information includes quantization-related parameters such as a quantization range, quantization precision, and a quantization manner.

Optionally, the network devices may further configure different quantization precision for different measurement quantities (for example, the received powers, the channel phases, and the channel matrices).

Optionally, the information about the reporting processing manner may further include differential configuration information.

The differential configuration information may indicate a differential object, for example, indicate whether differential processing is performed on the received powers, on the channel phases, or on all measurement quantities.

The differential configuration information may further indicate a differential basis. For example, when the measurement quantities are the received powers, a received power of a reference signal with a maximum received power is used as a differential basis for received powers of other reference signals. For another example, when the measurement quantities are the channel phases, a channel phase of a reference signal with a maximum channel phase is used as a differential basis for channel phases of other reference signals.

The information about the reporting manner of the information about the receive beam is used to indicate information describing a beam radiation mode. For example, the information about the reporting manner of the information about the receive beam indicates to report the beam radiation mode by using any one or more of an antenna and weight fitting parameter, a function fitting parameter, and beam gains of a beam at a plurality of angles.

The network devices may configure the reference signal configuration information, the measurement configuration information, and the reporting configuration information by using a downlink message together. Alternatively, the network devices may separately configure the reference signal configuration information, the measurement configuration information, and the reporting configuration information by using different downlink messages.

Optionally, in the foregoing embodiments, the reference signals measured by the terminal device may be reference signals in a same cell.

Optionally, in the foregoing embodiments, the reference signals measured by the terminal device may be reference signals that meet the following condition 1 or condition 2.

Condition 1: Meet a Power Threshold

When the received reference signals meet the power threshold, the terminal device measures the reference signals, and reports the reference signals in a subsequent step.

The power threshold may be configured by the network devices or agreed upon in a protocol.

Condition 2: Located in an Arrival Time Window

The arrival time window indicates an expected time point at which reference signals arrive at a receive end (namely, the terminal device). The arrival time window may also be referred to as an expected arrival time point.

The arrival time window may be configured by the network devices for the terminal device.

If the terminal device configures the arrival time window, the terminal device measures the reference signals in the arrival time window.

Optionally, the arrival time window may be an absolute time point.

For example, the arrival time window represents an absolute arrival time point determined based on a system frame number, a system time point, and the like.

Optionally, the arrival time window may be a relative time point.

For example, the arrival time window represents a relative arrival time point of one reference signal or a group of reference signals relative to one reference reference signal.

The reference reference signal may be specified by the network devices. For example, the reference reference signal is the reference signal set beam indication reference signal mentioned above.

Alternatively, the reference reference signal may be determined by the terminal device. For example, the terminal device determines the reference reference signal based on a measured strength of a beam, or uses a first detected arriving reference signal as the reference reference signal.

Optionally, the arrival time window may be configured for each reference signal.

Optionally, the arrival time window may be configured for one reference signal set.

Optionally, the arrival time window may be configured for all reference signals.

Optionally, the arrival time window may be configured for arrival time points of first paths of the reference signals. In other words, the first paths of the reference signals detected by the terminal device falls within the arrival time window.

Figure 7:
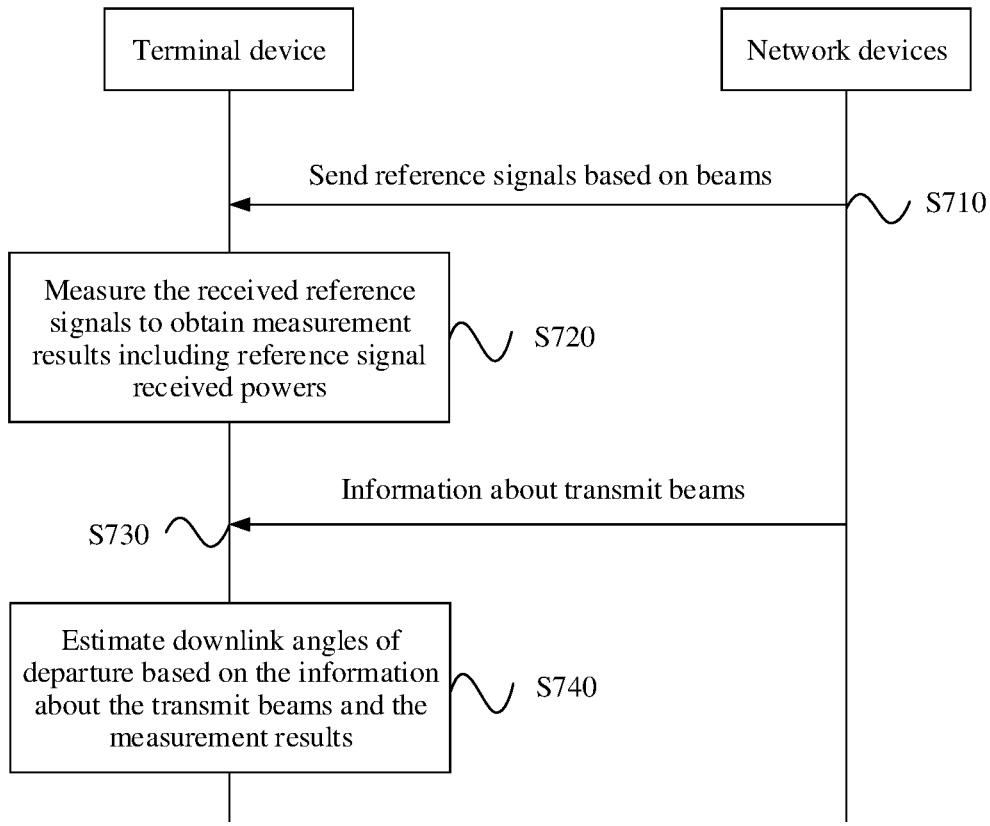
FIG. 7 is another schematic interaction diagram of a measurement reporting method according to an embodiment of this application.

As shown in FIG. 7, an embodiment of this application further provides a communication method 700. The communication method 700 includes the following steps.

S710: Network devices send reference signals to a terminal device based on beams.

The network devices send a plurality of reference signals to the terminal device based on the beams.

S720: After receiving the reference signals, the terminal device measures the received reference signals to obtain measurement results, where the measurement results include reference signal received powers (RSRPs).

Optionally, the terminal device measures all the received reference signals.

Optionally, the terminal device measures a part of the received reference signals.

S730: The network devices send information about transmit beams to the terminal device. The information about the transmit beams indicates related information about the beams for sending the reference signals.

The information about the transmit beams may include characteristic information of the transmit beams, and/or beam radiation mode information of the transmit beams, where the beam radiation mode information is information used to describe beam radiation modes of the transmit beams.

S740: The terminal device determines downlink angles of departure between the terminal device and the network devices based on the measurement results and the information about the transmit beams.

It should be understood that, that the network devices send information about transmit beams to the terminal device helps analyze the measurement results of the reference signals for the devices, so that orientations of the terminal device relative to the network devices can be estimated, and AODs between the terminal device and the network devices can be estimated.

Optionally, in the embodiment shown in FIG. 7, the information about the transmit beams may include the characteristic information of the transmit beams, and the characteristic information includes any one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to an earth coordinate system, and a sidelobe half-power width.

Optionally, in the embodiment shown in FIG. 7, the information about the transmit beams may include beam radiation mode information, and the beam radiation mode information includes any one or more of an antenna and beam weight fitting parameter, a function fitting parameter, and beam gains of a beam at a plurality of angles.

Optionally, in the embodiment shown in FIG. 7, when the beam radiation mode information includes the beam gains of the beam at the plurality of angles, a sending manner of the beam radiation mode information is sending beam gains of the transmit beam at the plurality of different angles in ascending order or descending order of angles, or sending beam gains of the transmit beam at the plurality of different angles in descending order or ascending order of beam gains.

In this embodiment, the network devices send the information about the transmit beams to the terminal device. Compared with the solution in which the terminal device sends the information about the receive beam to the network devices described in the foregoing embodiment, descriptions of other information are similar except for a difference between receiving and sending. That is, the description of the beam radiation mode information in the foregoing embodiment may be applied to this embodiment. For brevity, details are not described herein again.

Optionally, in the embodiment shown in FIG. 7, the measurement results in step S720 further include at least one of the following two items of information: channel phases of the reference signals and channel matrices of the reference signals.

The description of the channel phases is consistent with the description of the channel phases in the foregoing embodiment. For details, refer to the foregoing descriptions. Details are not described herein again.

The description of the channel matrices is consistent with the description of the channel matrices in the foregoing embodiment. For details, refer to the foregoing descriptions. Details are not described herein again.

In the embodiment shown in FIG. 7, the network devices send the information about the transmit beams to the terminal device. This helps analyze the measurement results of the reference signals for the devices, so that orientations of the terminal device relative to the network devices can be estimated, and AODs between the terminal device and the network devices can be estimated.

It should further be understood that various numbers such as first and second in this specification are used for differentiation only for ease of description, and are not used to limit the scope of the embodiments of the present invention.

The embodiments described in this specification may be independent solutions, or may be combined based on internal logic. These solutions all fall within the protection scope of this application.

It may be understood that, in the foregoing method embodiments, the methods and the operations implemented by the terminal device may also be implemented by a component (for example, a chip or a circuit) that may be used in the terminal device, and the methods and the operations implemented by the location management device may also be implemented by a component (for example, a chip or a circuit) that may be used in the location management device.

The foregoing describes the method embodiments provided in the embodiments of this application, and the following describes apparatus embodiments provided in the embodiments of this application. It should be understood that descriptions of the apparatus embodiments mutually correspond to the descriptions of the method embodiments. Therefore, for content that is not described in detail, refer to the foregoing method embodiments. For brevity, details are not described herein again.

The foregoing mainly describes, in terms of interaction between various devices, the solutions provided in the embodiments of this application. It may be understood that, to implement the foregoing functions, each device, such as a transmit-end device or a receive-end device, includes a corresponding hardware structure and/or software module for performing each function. A person skilled in the art may be aware that, with reference to the examples described in the embodiments disclosed in this specification, units and algorithm steps may be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmit-end device or the receive-end device may be divided into functional modules based on the foregoing method examples. For example, each functional module may be obtained through division based on a corresponding function, or two or more functions may be integrated into one processing module. The foregoing integrated module may be implemented in a form of hardware, or may be implemented in a form of a software functional module. It should be noted that the module division in the embodiments of this application is an example, and is merely logical function division. There may be another division manner during actual implementation. An example in which each functional module is obtained through division based on the corresponding function is used below for description.

Figure 8:
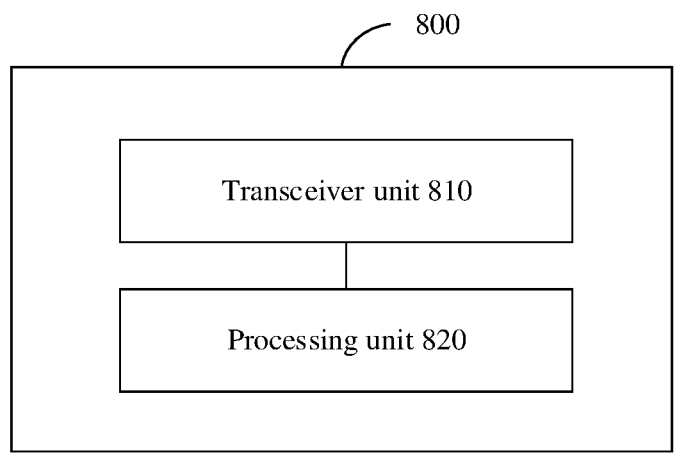
FIG. 8 is a schematic block diagram of a communication apparatus according to an embodiment of this application.

FIG. 8 is a schematic block diagram of a communication apparatus 800 according to an embodiment of this application. The communication apparatus 800 includes a transceiver unit 810 and a processing unit 820. The transceiver unit 810 may perform external communicate, and the processing unit 820 is configured to perform data processing.

The transceiver unit 810 may also be referred to as a communication interface or a communication unit.

The communication apparatus 800 may be configured to perform an action performed by the terminal device in the foregoing method embodiments, or perform an action performed by the network devices in the foregoing method embodiments.

In another implementation, the communication apparatus 800 may be configured to perform an action performed by the terminal device in the foregoing method 600. In the implementation, the communication apparatus 800 may be referred to as a terminal device. The transceiver unit 810 is configured to perform a receiving/sending-related operation of the terminal device in the foregoing method 600, and the processing unit 820 is configured to perform a processing-related operation of the terminal device in the foregoing method 600.

In this implementation, the transceiver unit 810 is configured to receive, from network devices, reference signals sent based on beams. The processing unit 820 is configured to measure the received reference signals to obtain measurement results. The transceiver unit 810 is further configured to send the measurement results to the network devices, where the measurement results include reference signal received powers and at least one of the following two items of information: channel phases of the reference signals and channel matrices of the reference signals.

For descriptions about the received powers, the channel phases, and the channel matrices, refer to the foregoing related descriptions. For brevity, details are not described herein again.

Optionally, the processing unit 820 is further configured to perform reporting processing on the measurement results, where the reporting processing includes either of or a combination of differentiation and quantization. The transceiver unit 810 is configured to send measurement results obtained after reporting processing to the network devices.

Optionally, the transceiver unit 810 is further configured to send, to the network devices, information about a receive beam used to receive the reference signals, where the information about the receive beam includes characteristic information of the receive beam, and/or beam radiation mode information of the receive beam, where the beam radiation mode information is information used to describe a beam radiation mode of the receive beam.

For descriptions about the characteristic information of the receive beam and the beam radiation mode information, refer to the foregoing related descriptions. For brevity, details are not described herein again.

In another implementation, the communication apparatus 800 may be configured to perform an action performed by the network devices in the foregoing method 600. In the implementation, the communication apparatus 800 may be referred to as a network device. The transceiver unit 810 is configured to perform a receiving/sending-related operation of the network devices in the foregoing method 600, and the processing unit 820 is configured to perform a processing-related operation of the network devices in the foregoing method 600.

In this implementation, the transceiver unit 810 is configured to send reference signals to a terminal device based on beams, and receive measurement results of the reference signals from the terminal device. The processing unit 820 is configured to obtain downlink angles of departure relative to the terminal device based on the measurement results, where the measurement results include reference signal received powers and at least one of the following two items of information: channel phases of the reference signals and channel matrices of the reference signals.

For descriptions about the received powers, the channel phases, and the channel matrices, refer to the foregoing related descriptions. For brevity, details are not described herein again.

Optionally, the measurement results received from the terminal device are the measurement results obtained after reporting processing. The reporting processing includes either of or a combination of differentiation and quantization.

Optionally, the transceiver unit 810 is further configured to receive information that is about a receive beam used to receive the reference signals and that is sent by the terminal device, where the information about the receive beam includes characteristic information of the receive beam and/or beam radiation mode information of the receive beam, where the beam radiation mode information is information used to describe a beam radiation mode of the receive beam.

For descriptions about the characteristic information of the receive beam and the beam radiation mode information, refer to the foregoing related descriptions. For brevity, details are not described herein again.

In yet another implementation, the communication apparatus 800 may be configured to perform an action performed by the network devices in the foregoing method 700. In the implementation, the communication apparatus 800 may be referred to as a network device. The transceiver unit 810 is configured to perform a receiving/sending-related operation of the network devices in the foregoing method 700, and the processing unit 820 is configured to perform a processing-related operation of the network devices in the foregoing method 700.

In this implementation, the transceiver unit 810 is configured to receive reference signals from network devices based on beams. The processing unit 820 is configured to measure the received reference signals to obtain measurement results, where the measurement results include reference signal received powers. The transceiver unit 810 is further configured to receive information about transmit beams from the network devices. The processing unit 820 is further configured to determine downlink angles of departure relative to the network devices based on the measurement results and the information about the transmit beams. The information about the transmit beams includes characteristic information of the transmit beams, and/or beam radiation mode information of the transmit beams, where the beam radiation mode information is information used to describe beam radiation modes of the transmit beams.

Optionally, in this implementation, the characteristic information of the transmit beams includes any one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to an earth coordinate system, and a sidelobe half-power width.

Optionally, in this implementation, the beam radiation mode information includes any one or more of an antenna and beam weight fitting parameter, a function fitting parameter, and beam gains of a beam at a plurality of angles.

Optionally, in this implementation, when the beam radiation mode information includes the beam gains of the beam at the plurality of angles, a sending manner of the beam radiation mode information is sending beam gains of the transmit beam at the plurality of different angles in ascending order or descending order of angles, or sending beam gains of the transmit beam at the plurality of different angles in descending order or ascending order of beam gains.

Optionally, in this implementation, the measurement results further include at least one of the following two items of information: channel phases of the reference signals and channel matrices of the reference signals.

For descriptions about the received powers, the channel phases, and the channel matrices, refer to the foregoing related descriptions. For brevity, details are not described herein again.

In still another implementation, the communication apparatus 800 may be configured to perform an action performed by the terminal device in the foregoing method 700. In the implementation, the communication apparatus 800 may be referred to as a terminal device. The transceiver unit 810 is configured to perform a receiving/sending-related operation of the terminal device in the foregoing method 700, and the processing unit 820 is configured to perform a processing-related operation of the terminal device in the foregoing method 700.

In this implementation, the processing unit 820 is configured to determine reference signals to be sent to the terminal device based on beams. The transceiver unit 810 is configured to send the reference signals to the terminal device based on the beams, and send information about transmit beams to the terminal device, where the information about the transmit beams includes characteristic information of the transmit beams and/or beam radiation mode information of the transmit beams, where the beam radiation mode information is information used to describe beam radiation modes of the transmit beams.

Optionally, in this implementation, the characteristic information of the transmit beams includes any one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to an earth coordinate system, and a sidelobe half-power width.

Optionally, in this implementation, the beam radiation mode information includes any one or more of an antenna and beam weight fitting parameter, a function fitting parameter, and beam gains of a beam at a plurality of angles.

Optionally, when the beam radiation mode information includes the beam gains of the beam at the plurality of angles, a sending manner of the beam radiation mode information is sending beam gains of the transmit beam at the plurality of different angles in ascending order or descending order of angles, or sending beam gains of the transmit beam at the plurality of different angles in descending order or ascending order of beam gains.

It should be understood that the processing unit 820 in the foregoing embodiment may be implemented by a processor or a processor-related circuit, and the transceiver unit 810 may be implemented by a transceiver or a transceiver-related circuit.

Figure 9:
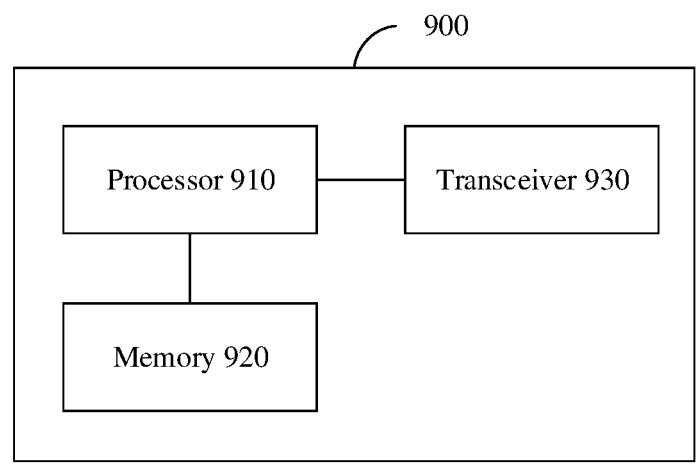
FIG. 9 is another schematic block diagram of a communication apparatus according to an embodiment of this application.

As shown in FIG. 9, an embodiment of this application further provides a communication apparatus 900. The communication apparatus 900 includes a processor 910, a memory 920, and a transceiver 930. The memory 920 stores a program. The processor 910 is configured to execute the program stored in the memory 920. Execution of the program stored in the memory 920 enables the processor 910 to perform related processing steps in the foregoing method embodiments, and enables the processor 910 to control the transceiver 930 to perform receiving/sending-related steps in the foregoing method embodiments.

In an implementation, the communication apparatus 900 is configured to perform an action performed by the terminal device in the foregoing method embodiments. In this case, the execution of the program stored in the memory 920 enables the processor 910 to perform processing steps on a terminal device side in the foregoing method embodiments, and enables the transceiver 930 to perform receiving and sending steps on the terminal device side in the foregoing method embodiments. Optionally, the execution of the program stored in the memory 920 enables the processor 910 to control the transceiver 930 to perform the receiving and sending steps on the terminal device side in the foregoing method embodiments.

In another implementation, the communication apparatus 900 is configured to perform an action performed by the network devices in the foregoing method embodiments. In this case, the execution of the program stored in the memory 920 enables the processor 910 to perform processing steps on a network device side in the foregoing method embodiments, and enables the transceiver 930 to perform receiving and sending steps on the network device side in the foregoing method embodiments. Optionally, the execution of the program stored in the memory 920 enables the processor 910 to control the transceiver 930 to perform the receiving and sending steps on the network device side in the foregoing method embodiments.

An embodiment of this application further provides a communication apparatus 1000. The communication apparatus 1000 may be a terminal device or a chip. The communication apparatus 1000 may be configured to perform an action performed by the terminal device in the foregoing method embodiments.

Figure 10:
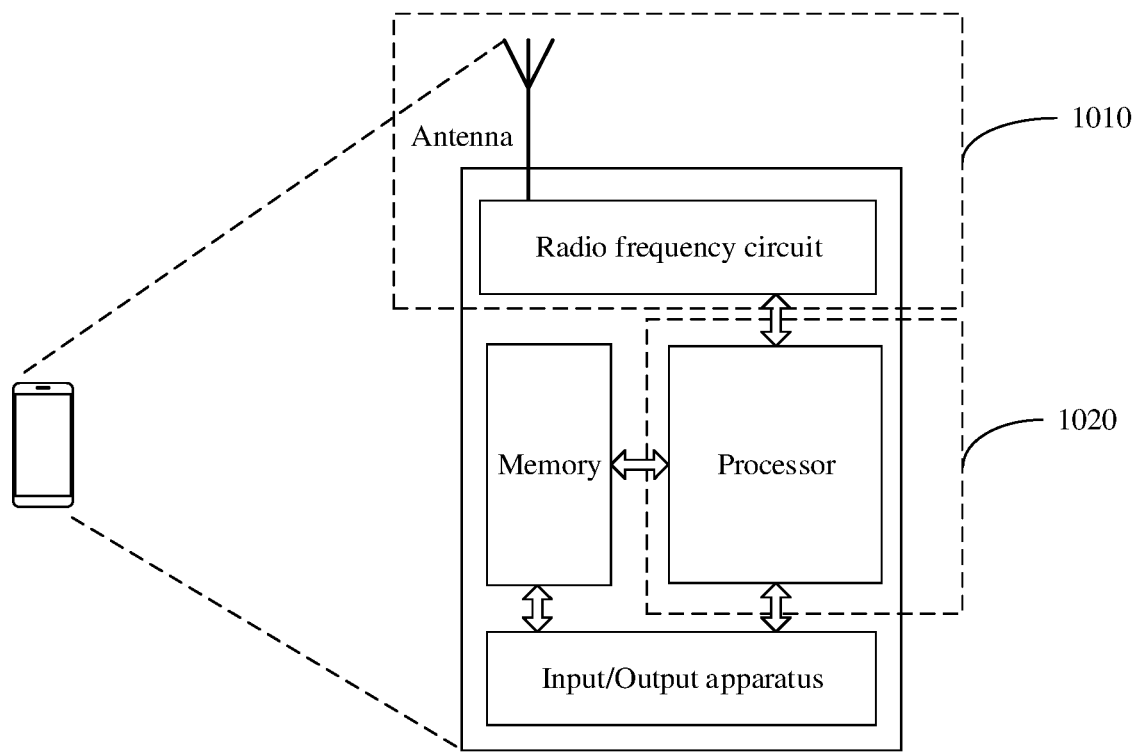
FIG. 10 is a schematic block diagram of a terminal device according to an embodiment of this application.

When the communication apparatus 1000 is a terminal device, FIG. 10 is a simplified schematic diagram of a structure of a terminal device. For ease of understanding and illustration, in FIG. 10, an example in which the terminal device is a mobile phone is used. As shown in FIG. 10, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In the embodiments of this application, the antenna and the radio frequency circuit that have receiving and sending functions may be considered as a transceiver unit of the terminal device, and the processor that has a processing function may be considered as a processing unit of the terminal device.

As shown in FIG. 10, the terminal device includes a transceiver unit 1010 and a processing unit 1020. The transceiver unit 1010 may also be referred to as a transceiver, a transceiver machine, a transceiver apparatus, or the like. The processing unit 1020 may also be referred to as a processor, a processing board, a processing module, a processing apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the transceiver unit 1010 is further configured to perform a receiving operation on a terminal device side in step S610 and a sending operation on the terminal device side in step S630 shown in FIG. 6, and/or the transceiver unit 1010 is further configured to perform another receiving and sending step on the terminal device side. The processing unit 1020 is configured to perform step S620 shown in FIG. 6.

For another example, in an implementation, the transceiver unit 1010 is further configured to perform receiving operations on a terminal device side in steps S710 and S730 shown in FIG. 7, and/or the transceiver unit 1010 is further configured to perform another receiving and sending step on the terminal device side. The processing unit 1020 is configured to perform step S720 and step S740 shown in FIG. 7.

It should be understood that FIG. 10 is merely an example instead of a limitation. The terminal device including the transceiver unit and the processing unit may not depend on the structure shown in FIG. 10.

When the communication apparatus 1000 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication apparatus 1100. The communication apparatus 1100 may be a network device or a chip. The communication apparatus 1100 may be configured to perform an action performed by the network devices in the foregoing method embodiments.

Figure 11:
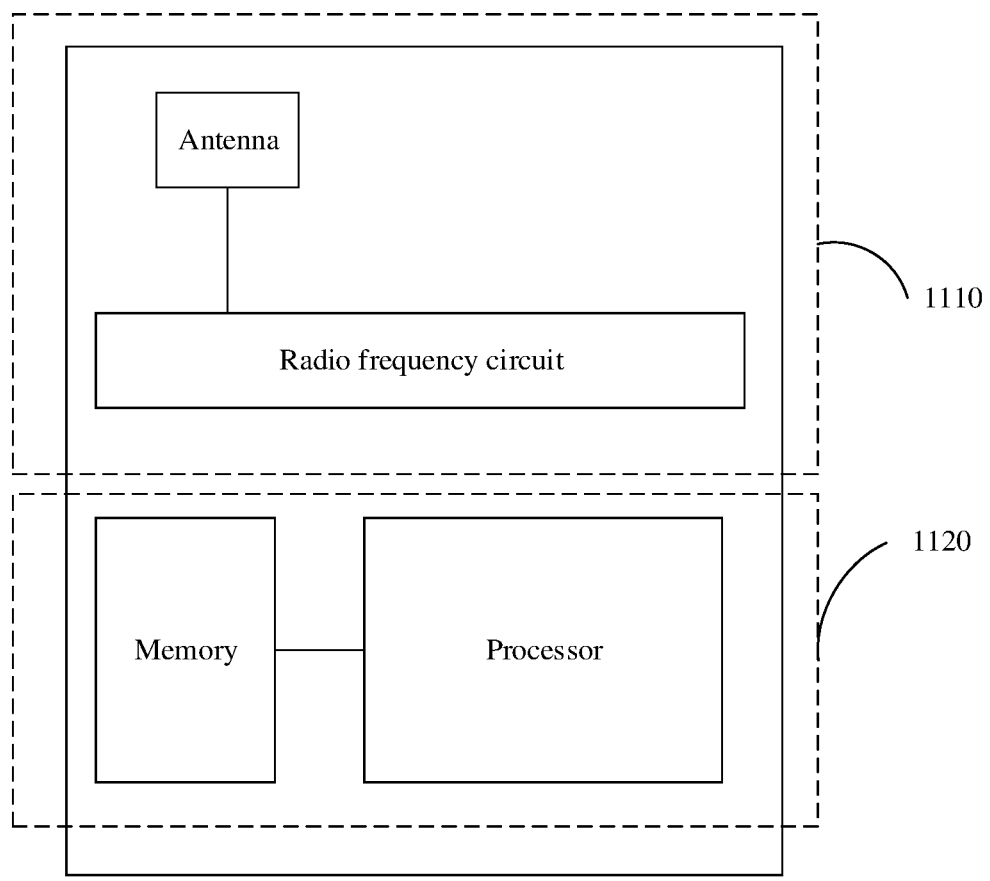
FIG. 11 is a schematic block diagram of a network device according to an embodiment of this application.

When the communication apparatus 1100 is a network device, for example, a base station, FIG. 11 is a simplified schematic diagram of a structure of a base station. The base station includes a part 1110 and a part 1120. The part 1110 is mainly configured to send and receive a radio frequency signal, and perform conversion between the radio frequency signal and a baseband signal. The part 1120 is mainly configured to perform baseband processing, control the base station, and so on. The part 1110 may be usually referred to as a transceiver unit, a transceiver machine, a transceiver circuit, a transceiver, or the like. The part 1120 is usually a control center of the base station, and may usually be referred to as a processing unit, and is configured to control the base station to perform processing operations on a network device side in the foregoing method embodiments.

The transceiver unit in the part 1110 may also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 1110 may be considered as a receiving unit, and a component for implementing a sending function may be considered as a sending unit. That is, the part 1110 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1120 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit 1010 is further configured to perform a sending operation on the network device side in step S610 shown in FIG. 6 and a receiving operation on the network device side in step S660, and/or the transceiver unit 1010 is further configured to perform another receiving and sending step on the network device side. The processing unit 1020 is configured to perform step S640 shown in FIG. 6.

For another example, in an implementation, the transceiver unit 1010 is further configured to perform sending operations on the network device side in step S710 and step S730 shown in FIG. 7, and/or the transceiver unit 1010 is further configured to perform another receiving and sending step on the terminal device side.

It should be understood that FIG. 11 is merely an example instead of a limitation. The network device including the transceiver unit and the processing unit may not depend on the structure shown in FIG. 11.

When the communication apparatus 1100 is a chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium. The computer-readable storage medium stores a computer program. When the computer program is executed by a computer, the computer is enabled to implement the method on a terminal device side or the method on a network device side in the foregoing method embodiments.

An embodiment of this application further provides a computer program product including instructions. When the instructions are executed by a computer, the computer is enabled to implement the method on a terminal device side or the method on a network device side in the foregoing method embodiments.

An embodiment of this application further provides a positioning system, including the terminal device according to the embodiments of this application and the network devices according to the embodiments of this application.

For explanations and beneficial effects of related content of any of the communication apparatuses provided above, refer to the corresponding method embodiments provided above, and details are not described herein again.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the methods provided in the embodiments of this application is not specifically limited in the embodiments of this application provided that a program that records code for the method provided in the embodiments of this application can be run to perform communication according to the methods provided in the embodiments of this application. For example, the execution body of the methods provided in the embodiments of this application may be the terminal device, the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc CD) or a digital versatile disc (DVD)), a smart card, and a flash memory component (for example, an erasable programmable read-only memory (EPROM), a card, a stick, or a key drive). In addition, various storage media described in this application may indicate one or more devices and/or other machine-readable media that are configured to store information. The term "machine-readable media" may include but is not limited to a wireless channel, and various other media that can store, include, and/or carry instructions and/or data.

It should be understood that, the processor mentioned in the embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should further be understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this application includes but is not limited to the foregoing memory, and further includes any other suitable type of memory.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions described above are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A measurement reporting method, comprising:
  receiving, by a terminal device, from network devices, reference signals based on beams;
  obtaining, by the terminal device, measurement results by measuring the received reference signals, wherein the measurement results comprise reference signal received powers, and further comprise at least one of channel phases, measured by the terminal device from the received reference signals, of the reference signals or channel matrices, measured by the terminal device from the received reference signals, of the reference signals, wherein the channel phases of the reference signals indicate related information about phases of channels through which the reference signals delivered by the network devices pass, and wherein the channel matrices of the reference signals indicate related information about channel matrices of the channels through which the reference signals delivered by the network devices pass;
  receiving, by the terminal device after obtaining the measurement results, information about transmit beams sent by the network devices separately from the reference signals;
  determining, by the terminal device, an orientation of the terminal device relative to the network devices and according to the reference signal received powers that are measured by the terminal device and that are of the measurement results, further according to the at least one of the channel phases that are of the measurement results and that are measured by the terminal device from the received reference signals or the channel matrices that are of the measurement results and that are measured by the terminal device from the received reference signals, of the reference signals and further according to the information about the transmit beams; and
  determining, by the terminal device, downlink angles of departure relative to the network devices based on the measurement results and the information about the transmit beams;
  wherein the information about the transmit beams comprises at least one of characteristic information of individual transmit beams of the transmit beams or beam radiation mode information of individual transmit beams of the transmit beams.

2. The method according to claim 1, wherein the characteristic information of the transmit beams comprises one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to the earth coordinate system, or a sidelobe half-power width.

3. The method according to claim 1, wherein the beam radiation mode information comprises any one or more of an antenna and beam weight fitting parameter, a function fitting parameter, or beam gains of a beam at a plurality of angles.

4. The method according to claim 3, wherein the beam radiation mode information comprises the beam gains of the beam at the plurality of angles, and wherein a sending manner of the beam radiation mode information is at least one of sending beam gains of the transmit beam at the plurality of angles in ascending order or descending order of angles, or sending beam gains of the transmit beam at the plurality of angles in descending order or ascending order of beam gains.

5. The method according to claim 1, wherein the measurement results comprise the channel matrices of the reference signals, and wherein the channel matrices are vectors, or matrices obtained by calculating covariances of vectors.

6. The method according to claim 1, wherein the channel phases of the reference signals comprise at least one of phases on time domain paths on the reference signals, or phases determined based on phases of all reference signals within a measurement bandwidth.

7. The method according to claim 1, wherein the channel matrices of the reference signals comprise at least one of an inter-beam channel matrix or an intra-beam channel matrix.

8. The method according to claim 7, wherein the intra-beam channel matrix comprises at least one of a channel matrix determined on different time domain paths of a same reference signal, or a channel matrix determined on different frequency domain subbands of a same reference signal.

9. A measurement reporting method, comprising:
  sending reference signals by network devices to a terminal device based on beams, wherein sending the reference signals causes the terminal device to obtain measurement results that comprise reference signal received powers by measuring the reference signals received at the terminal device, and that further comprise at least one of channel phases, measured by the terminal device from the received reference signals, of the reference signals or channel matrices, measured by the terminal device from the received reference signals, of the reference signals, wherein the channel phases of the reference signals indicate related information about phases of channels through which the reference signals pass, and wherein the channel matrices of the reference signals indicate related information about channel matrices of the channels through which the reference signals pass; and sending information about transmit beams to the terminal device separately from the sending of the reference signals and after the terminal device obtains the measurement results, wherein the sending the information about the transmit beams causes the terminal device to determine an orientation of the terminal device relative to the network device and according to the reference signal received powers that are measured by the terminal device and that are of the measurement results, further according to the at least one of the channel phases that are of the measurement results and that are measured by the terminal device from the received reference signals or the channel matrices that are of the measurement results and that are measured by the terminal device from the received reference signals, of the reference signals and further according to the information about the transmit beams, and further causes the terminal device to determine downlink angles of departure relative to the network devices based on the measurement results and the information about the transmit beams;

wherein the information about the transmit beams comprises at least one of characteristic information of individual transmit beams of the transmit beams or beam radiation mode information of individual transmit beams of the transmit beams.

10. The method according to claim 9, wherein the characteristic information of the transmit beams comprises one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to the earth coordinate system, or a sidelobe half-power width.

11. The method according to claim 9, wherein the beam radiation mode information comprises one or more of an antenna and beam weight fitting parameter, a function fitting parameter, or beam gains of a beam at a plurality of angles.

12. The method according to claim 11, wherein the beam radiation mode information comprises the beam gains of the beam at the plurality of angles, and wherein a sending manner of the beam radiation mode information is at least one of sending beam gains of the transmit beam at the plurality of angles in ascending order or descending order of angles or sending beam gains of the transmit beam at the plurality of angles in descending order or ascending order of beam gains.

13. A terminal device, comprising:
a transceiver;
a processor; and
a non-transitory computer readable medium storing a program for execution by the processor, the program including instructions to:
receive, from network devices, through the transceiver, reference signals based on beams;
obtain measurement results by measuring the received reference signals, wherein the measurement results comprise reference signal received powers, and further comprise at least one of channel phases, measured by the terminal device from the received reference signals, of the reference signals or channel matrices, measured by the terminal device from the received reference signals, of the reference signals, wherein the channel phases of the reference signals indicate related information about phases of channels through which the reference signals delivered by the network devices pass, and wherein the channel matrices of the reference signals indicate related information about channel matrices of the channels through which the reference signals delivered by the network devices pass;
receive, through the transceiver, after obtaining the measurement results information about transmit beams sent by the network devices separately from the reference signals;
determine an orientation of the terminal device relative to the network devices and according to the reference signal received powers that are measured by the terminal device and that are of the measurement results, further according to the at least one of the channel phases that are of the measurement results and that are measured by the terminal device from the received reference signals or the channel matrices that are of the measurement results and that are measured by the terminal device from the received reference signals, of the reference signals and further according to the information about the transmit beams; and
determine downlink angles of departure relative to the network devices based on the measurement results and the information about the transmit beams;
wherein the information about the transmit beams comprises at least one of characteristic information of individual transmit beams of the transmit beams or beam radiation mode information of individual transmit beams of the transmit beams.

14. The terminal device according to claim 13, wherein the characteristic information of the transmit beams comprises one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to the earth coordinate system, or a sidelobe half-power width.

15. The terminal device according to claim 13, wherein the beam radiation mode information comprises one or more of an antenna and beam weight fitting parameter, a function fitting parameter, or beam gains of a beam at a plurality of angles.

16. The terminal device according to claim 15, wherein the beam radiation mode information comprises the beam gains of the beam at the plurality of angles, and wherein a sending manner of the beam radiation mode information is at least one of sending beam gains of the transmit beam at the plurality of angles in ascending order or descending order of angles, or sending beam gains of the transmit beam at the plurality of angles in descending order or ascending order of beam gains.

17. A network device, comprising:
a transceiver;

a processor; and a non-transitory computer readable medium storing a program for execution by the processor, the program including instructions to:

determine reference signals to be sent to a terminal device based on beams; and send, through the transceiver, the reference signals to the terminal device based on the beams, wherein sending the reference signals causes the terminal device to obtain measurement results that comprise reference signal received powers by measuring the reference signals received at the terminal device, and further comprise at least one of channel phases, measured by the terminal device from the received reference signals, of the reference signals or channel matrices, measured by the terminal device from the received reference signals, of the reference signals, wherein the channel phases of the reference signals indicate related information about phases of channels through which the reference signals delivered pass, and wherein the channel matrices of the reference signals indicate related information about channel matrices of the channels through which the reference signals pass; and send, through the transceiver, information about transmit beams to the terminal device separately from the sending of the reference signals and after the terminal device obtains the measurement results, wherein sending the information about the transmit beams causes the terminal device to determine an orientation of the terminal device relative to the network device and according to the reference signal received powers that are measured by the terminal device and that are of the measurement results, further according to the at least one of the channel phases that are of the measurement results and that are measured by the terminal device from the received reference signals or the channel matrices that are of the measurement results and that are measured by the terminal device from the received reference signals, of the reference signals, and further according to the information about the transmit beams, and further causes the terminal device to determine downlink angles of departure relative to the network device based on the measurement results and the information about the transmit beams;

wherein the information about the transmit beams comprises at least one of characteristic information of individual transmit beams of the transmit beams or beam radiation mode information of individual transmit beams of the transmit beams.

18. The network device according to claim 17, wherein the characteristic information of the transmit beams comprises one or more of a beam identifier, a beam number, a half-power width of a beam, an orientation of a beam center relative to a beam panel, an orientation of a beam relative to an earth coordinate system, a maximum beam gain and a gain direction, null positions, a width between adjacent nulls, an orientation of a sidelobe center relative to a beam panel, an orientation of a sidelobe center relative to the earth coordinate system, or a sidelobe half-power width.

19. The network device according to claim 17, wherein the beam radiation mode information comprises one or more of an antenna and beam weight fitting parameter, a function fitting parameter, or beam gains of a beam at a plurality of angles.

20. The network device according to claim 19, wherein the beam radiation mode information comprises the beam gains of the beam at the plurality of angles, and wherein a sending manner of the beam radiation mode information is at least one of sending beam gains of the transmit beam at the plurality of angles in ascending order or descending order of angles or sending beam gains of the transmit beam at the plurality of angles in descending order or ascending order of beam gains.

* * * * *